(12) United States Patent  
Snell et al.

(10) Patent No.: US 11,964,208 B2  
(45) Date of Patent: Apr. 23, 2024

(54) LOCATION BASED AUGMENTED REALITY GAMING SYSTEM

(71) Applicant: PuttScape, Inc., Fort Collins, CO (US)

(72) Inventors: Dana Snell, Fort Collins, CO (US); Michael Dykier, Fort Collins, CO (US)

(73) Assignee: PuttScape, Inc., Fort Collins, CO (US)

( * ) Notice: Subject to any disclaimer, the term of this patent is extended or adjusted under 35 U.S.C. 154(b) by 0 days.

(21) Appl. No.: 18/073,843

(22) Filed: Dec. 2, 2022

(65) Prior Publication Data

US 2023/0098253 A1   Mar. 30, 2023

Related U.S. Application Data

(63) Continuation of application No. PCT/US2021/035803, filed on Jun. 3, 2021.

(60) Provisional application No. 63/033,973, filed on Jun. 3, 2020.

(51) Int. Cl.
  *A63F 13/65* (2014.01)
  *A63F 13/212* (2014.01)
  *A63F 13/213* (2014.01)
  *A63F 13/216* (2014.01)
  *A63F 13/25* (2014.01)
  *A63F 13/428* (2014.01)
  *A63F 13/5255* (2014.01)

(52) U.S. Cl.
  CPC ............ *A63F 13/65* (2014.09); *A63F 13/212* (2014.09); *A63F 13/213* (2014.09); *A63F 13/216* (2014.09); *A63F 13/25* (2014.09); *A63F 13/428* (2014.09); *A63F 13/5255* (2014.09)

(58) Field of Classification Search
  CPC ...... A63F 13/65; A63F 13/212; A63F 13/213; A63F 13/216; A63F 13/25; A63F 13/428; A63F 13/5255
  See application file for complete search history.

(56) References Cited

U.S. PATENT DOCUMENTS 10,512,832 B2 * 12/2019 Huston ................ H04W 4/029  
11,054,893 B2    7/2021 Bretschneider et al.  
(Continued)

OTHER PUBLICATIONS

International Search Report and the Written Opinion of the International Searching Authority for International Application No. PCT/US2021/035803 dated Aug. 30, 2021.

*Primary Examiner* — Seng H Lim  
(74) *Attorney, Agent, or Firm* — Warner Norcross + Judd LLP

(57) ABSTRACT

An augmented reality (AR) gaming system: samples a first signal encoding data representative of an object's location in a game space, the first signal being, or originating from, a first sensor's signal that identifies the object; samples at least a second signal encoding data representative of the object's location in the game space, the at least a second signal being, or originating from, at least a second sensor's signal that identifies the object, where the first sensor is different from the at least a second sensor; tracks the location of the object in the game space based upon the data representative of the location of the object from both of the first, and the at least a second, signals; and causes visual graphics to be provided to an AR apparatus wearable by the player in response to the tracking of the location of the object in the game space.

24 Claims, 13 Drawing Sheets

(56) References Cited

U.S. PATENT DOCUMENTS

| | | | |
|---|---|---|---|
| 2004/0212630 A1* | 10/2004 | Hobgood | G06T 19/006 345/633 |
| 2012/0190455 A1* | 7/2012 | Briggs | A63F 13/48 463/42 |
| 2014/0020445 A1 | 1/2014 | Waters et al. | |
| 2014/0347265 A1* | 11/2014 | Aimone | G02C 11/10 345/156 |
| 2015/0091780 A1* | 4/2015 | Lyren | G06F 1/163 345/8 |
| 2015/0343291 A1 | 12/2015 | Leech | |
| 2016/0224103 A1 | 8/2016 | Kochi | |
| 2016/0227509 A1 | 8/2016 | Krenz | |
| 2016/0275722 A1 | 9/2016 | Bretschneider et al. | |
| 2016/0300395 A1 | 10/2016 | Bretschneider et al. | |
| 2016/0316336 A1 | 10/2016 | Krenz et al. | |
| 2017/0282010 A1* | 10/2017 | Kuiper | A63B 43/004 |
| 2018/0255285 A1* | 9/2018 | Hall | A63F 13/5255 |
| 2018/0261010 A1* | 9/2018 | Kudirka | A63B 24/0021 |
| 2018/0342106 A1 | 11/2018 | Rosado | |
| 2019/0026936 A1* | 1/2019 | Gorur Sheshagiri | G06F 3/0304 |
| 2019/0043260 A1* | 2/2019 | Anderson | G06F 3/017 |
| 2019/0206132 A1* | 7/2019 | Zielkowski | G02B 27/017 |
| 2019/0321723 A1 | 10/2019 | Fuchs | |
| 2020/0013312 A1* | 1/2020 | Pregizer | A63B 24/0021 |
| 2020/0330830 A1* | 10/2020 | Carew-Jones | A63B 43/004 |
| 2021/0116992 A1 | 4/2021 | Bretschneider et al. | |
| 2021/0118231 A1* | 4/2021 | Hutten | G06F 3/011 |
| 2021/0218905 A1* | 7/2021 | Wolfensparger | G06V 20/20 |
| 2021/0379445 A1* | 12/2021 | Korpach | A63F 13/573 |
| 2022/0357440 A1* | 11/2022 | Hugmark | G01S 13/58 |
| 2022/0387873 A1* | 12/2022 | Hall | A63B 24/0021 |
| 2023/0241472 A1* | 8/2023 | Gunn | A63B 67/02 473/163 |

* cited by examiner

LOCATION BASED AUGMENTED REALITY GAMING SYSTEM

CROSS-REFERENCE TO RELATED APPLICATIONS

This application is a continuation of PCT application PCT/US2021/035803, filed on Jun. 3, 2021, now published as WO2021/247940, which claims the benefit of U.S. Provisional Application Ser. No. 63/033,973 filed Jun. 3, 2020, which are both incorporated herein by reference in their entirety for all purposes.

BACKGROUND

Gaming systems are known that incorporate real equipment with beacon technology for tracking game-related physical objects through space. Such gaming systems do not include computer vision, and so do not provide an augmented reality gaming experience to players. Some known gaming systems do incorporate real equipment with augmented reality. Such gaming systems do not include beacon-based location tracking technology, and so do not provide the ability to track game-related physical objects through space when those objects are out of sight of augmented reality (AR) glasses used by players. Other known gaming systems are exclusively AR-based and do not involve actual equipment used by the player during game play.

Accordingly, a need exists for technology that overcomes various drawbacks of AR gaming systems, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

Exemplary embodiments of the present technology that are shown in the drawings are summarized below. These and other embodiments are more fully described in the Detailed Description section. It is to be understood, however, that there is no intention to limit the invention to the forms described in this Summary or in the Detailed Description. One skilled in the art can recognize that there are numerous modifications, equivalents and alternative constructions that fall within the spirit and scope of the invention as expressed herein.

Embodiments of the present technology provide an augmented reality (AR) gaming system that allows participating players to use actual physical game-related equipment (e.g., a miniature golf ball) to interact with the virtual worlds of the game. The AR gaming system employs two separate tracking technologies for tracking the same game-related object to achieve a high level of precision in tracking the objects during play. The tracking information is what makes the interactions with the virtual world possible. Use of at least two techniques for tracking the location of the object in play creates at least two data sets that are blended together to leverage the strengths of the individual techniques. Among the at least two methods of tracking are beacon-based technology and color blob detections (also referred to herein as "computer vision"). The systems, methods and software of the present technology enable an immersive game play experience for players that brings together interactions with the virtual world and real physical game equipment.

The location-based AR gaming system according to the present technology integrates the two different tracking technologies to create two data sets from the physical world (also referred to herein as the "game space") in order to interact with the computer-generated virtual world of the game. The beacon technology is an essential part of the system because it provides three dimensional (3D) trilateration information to the virtual world, which supplements the computer vision tracking when the object being tracked is out of sight of the AR glasses and/or other video imaging sensors. The gaming system includes a game object to be tracked. A beacon tag is positioned inside of, or attached to, the game object to be tracked. The gaming system includes two or more beacon anchors positioned in disparate locations in, or proximal to, the game space. The beacon tag communicates with the two or more beacon anchors for purposes of tracking the game object. The gaming system includes an AR apparatus, such as glasses, goggles, a headset, or like devices. The AR apparatus enables players using the gaming system and participating in an associated game to see the game space concurrently with the virtual world and to track the game object through the computer vision.

One embodiment of the present technology provides an augmented reality at (AR) gaming system. The AR gaming system includes a processor and a communication interface operably coupled in communication with the processor. The AR gaming system includes a first sensor operably coupled in communication with the processor. The first sensor is configured, or otherwise operable, to transmit, to the processor via the communication interface, a first sensor signal that identifies at least object in a game space of the AR gaming system. The AR gaming system includes at least a second sensor operably coupled in communication with the processor. The at least a second sensor is configured, or otherwise operable, to transmit, to the processor via the communication interface, least a second sensor signal that identities the at least object in the game space. The AR gaming system includes an AR apparatus wearable by a player in an AR game provided, at least in part, to the player by the AR gaming system. The at least one object is movable by the player in the AR game. For use in the AR gaming system, the processor is programmed or otherwise configured to: sample a first signal encoding data representative of a location of the at least one object in the game space, wherein the first signal is, or originates from, the first sensor signal; sample at least a second signal encoding data representative of the location of the at least one object in the game space, wherein the at least a second signal is, or originates from, at least a second sensor signal and wherein the at least a second sensor is different from the first sensor; track the location of the at least one object in the game space based upon the data representative of the location of the at least one object from both of the first, and the at least a second, signals; and cause visual graphics to be provided to the AR apparatus in response to the location of the at least one object being tracked in the game space.

Another embodiment of the present technology provides a method executed on a computing device to operate an AR gaming system. The method includes the step of sampling a first signal encoding data representative of a location of a physical object in a game space of the AR gaming system. The first signal is, or originates from, a first sensor signal that identifies the object, where the first sensor signal is transmitted by a first sensor positioned in, or proximal to, the game space. The object is movable by a player in an AR game provided, at least in part, to the player by the AR gaming system. The method includes the step of sampling at least a second signal encoding data representative of the location of the object in the game space. The at least a second signal is, or originates from, at least a second sensor signal that identifies the object, where the at least a second sensor signal is transmitted by at least a second sensor positioned in, or proximal to, the game space. The at least a second sensor is different from the first sensor. The method includes the step of tracking the location of the object in the game space based upon the data representative of the location of the object from both of the first, and the at least a second, signals. The method includes the step of causing visual graphics to be provided to an AR apparatus wearable by the player in response to the tracking of the location of the object in the game space.

Yet another embodiment of the present technology provides a computer program product, which may, at least in part, take the form of one or more non-transitory computer readable media. The one or more non-transitory computer readable media have program instructions stored thereon which, when executed by at least one processor of an AR gaming system, cause one or more machines to sample a first signal encoding data representative of a location of a physical object in a game space of the AR gaming system. The first signal is, or originates from, a first sensor signal that identifies the object. The object is movable by a player in an AR game provided, at least in part, to the player by the AR gaming system. When executed by the at least one processor of the AR gaming system, the program instructions further cause the one or more machines to sample at least a second signal encoding data representative of the location of the object in the game space. The at least a second signal is, or originates from, at least a second sensor signal that identifies the object. The at least a second sensor is different from the first sensor. When executed by the at least one processor of the AR gaming system, the program instructions further cause the one or more machines to track the location of the object in the game space based upon the data representative of the location of the object from both of the first, and the at least a second, signals. When executed by the at least one processor of the AR gaming system, the program instructions further cause the one or more machines to cause visual graphics to be provided to an AR apparatus wearable by the player in response to the location of the object being tracked in the game space.

Still another embodiment of the present technology provides a miniature golf facility. The miniature golf facility may be an indoor facility, an outdoor facility, or a combination indoor and outdoor facility. The miniature golf facility includes at least one hole having a play surface set apart from a surrounding surface. The miniature golf facility includes an AR gaming system. The AR gaming system includes a processor and a communication interface operably coupled in communication with the processor. The AR gaming system includes a first sensor operably coupled in communication with the processor. The first sensor is configured, or otherwise operable, to transmit, to the processor via the communication interface, a first sensor signal that identifies at least one golf ball object in a game space of the miniature golf facility. The miniature golf facility includes at least a second sensor operably coupled in communication with the processor. The at least a second sensor is configured, or otherwise operable, to transmit, to the processor via the communication interface, least a second sensor signal that identities the at least one golf ball object in the game space. The AR gaming system includes an AR apparatus wearable by a player in an AR miniature golf game provided, at least in part, to the player by the AR gaming system. The at least one golf ball object is movable by the player in the AR miniature golf game. For use in the AR gaming system, the processor is programmed or otherwise configured to: sample a first signal encoding data representative of a location of the at least one golf ball object in the game space, wherein the first signal is, or originates from, the first sensor signal; sample at least a second signal encoding data representative of the location of the at least one golf ball object in the game space, wherein the at least a second signal is, or originates from, at least a second sensor signal and wherein the at least a second sensor is different from the first sensor; track the location of the at least one golf ball object in the game space based upon the data representative of the location of the at least one golf ball object from both of the first, and the at least a second, signals; and cause visual graphics to be provided to the AR apparatus in response to the tracking of the location of the at least one golf ball object in the game space.

As previously stated, the above-described embodiments and implementations are for illustration purposes only. Numerous other embodiments, implementations, and details of the technology are readily recognized by those of skill in the art from the following descriptions.

BRIEF DESCRIPTION OF THE DRAWINGS

One or more embodiments of the present invention are illustrated by way of example and not limitation in the figures of the accompanying drawings, in which like references indicate similar elements.

Figure 1:
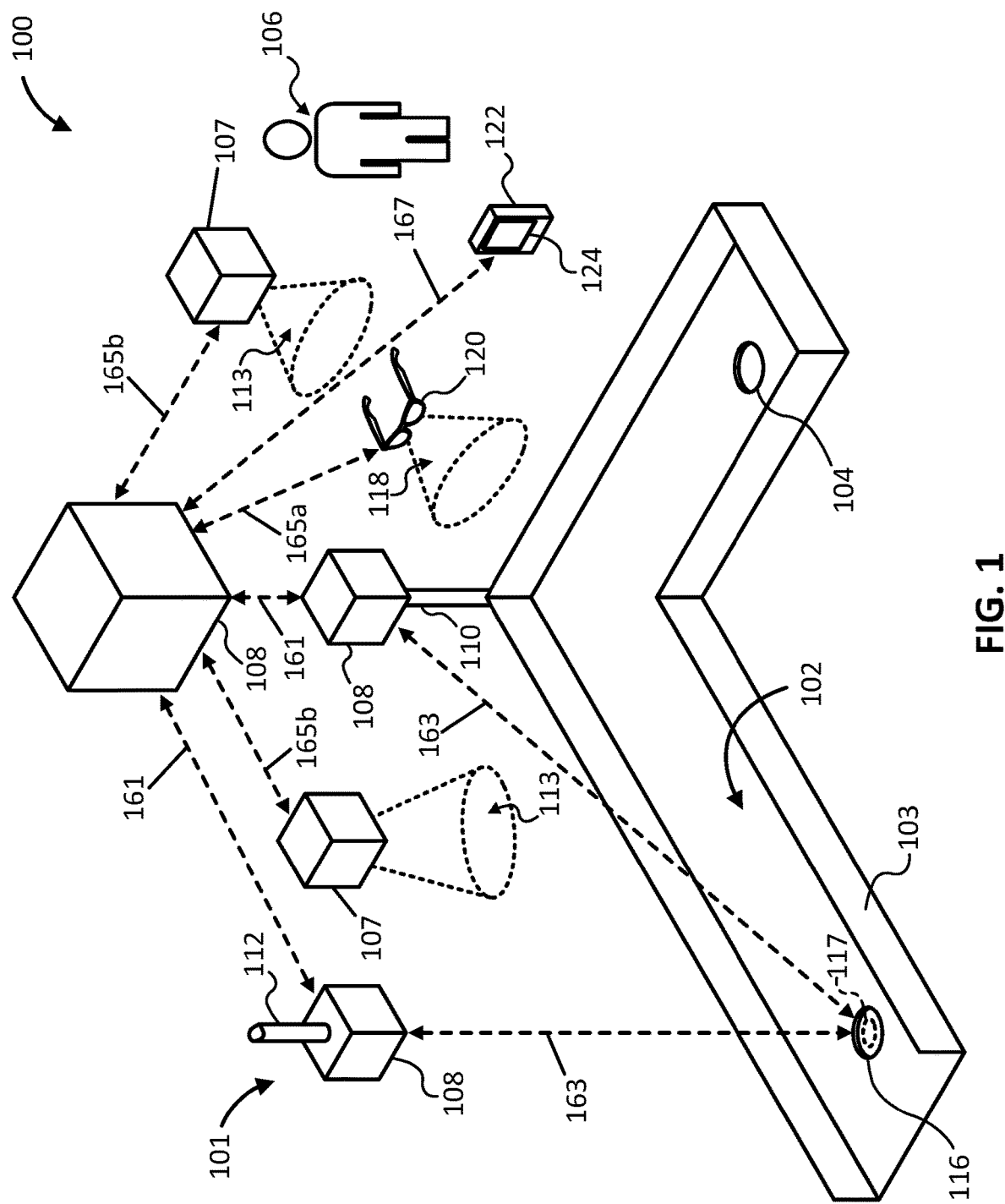
FIG. 1 depicts a perspective diagram of a miniature golf facility according to an embodiment of the present technology.

The drawings have not necessarily been drawn to scale. For example, the dimensions of some of the elements in the figures may be expanded or reduced to help improve the understanding of the embodiments of the present technology. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology described herein is intended to cover all modifications, equivalents, and alternatives falling within the scope of the technology as defined by the appended claims.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" of "some embodiments" and like phrases means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 2:
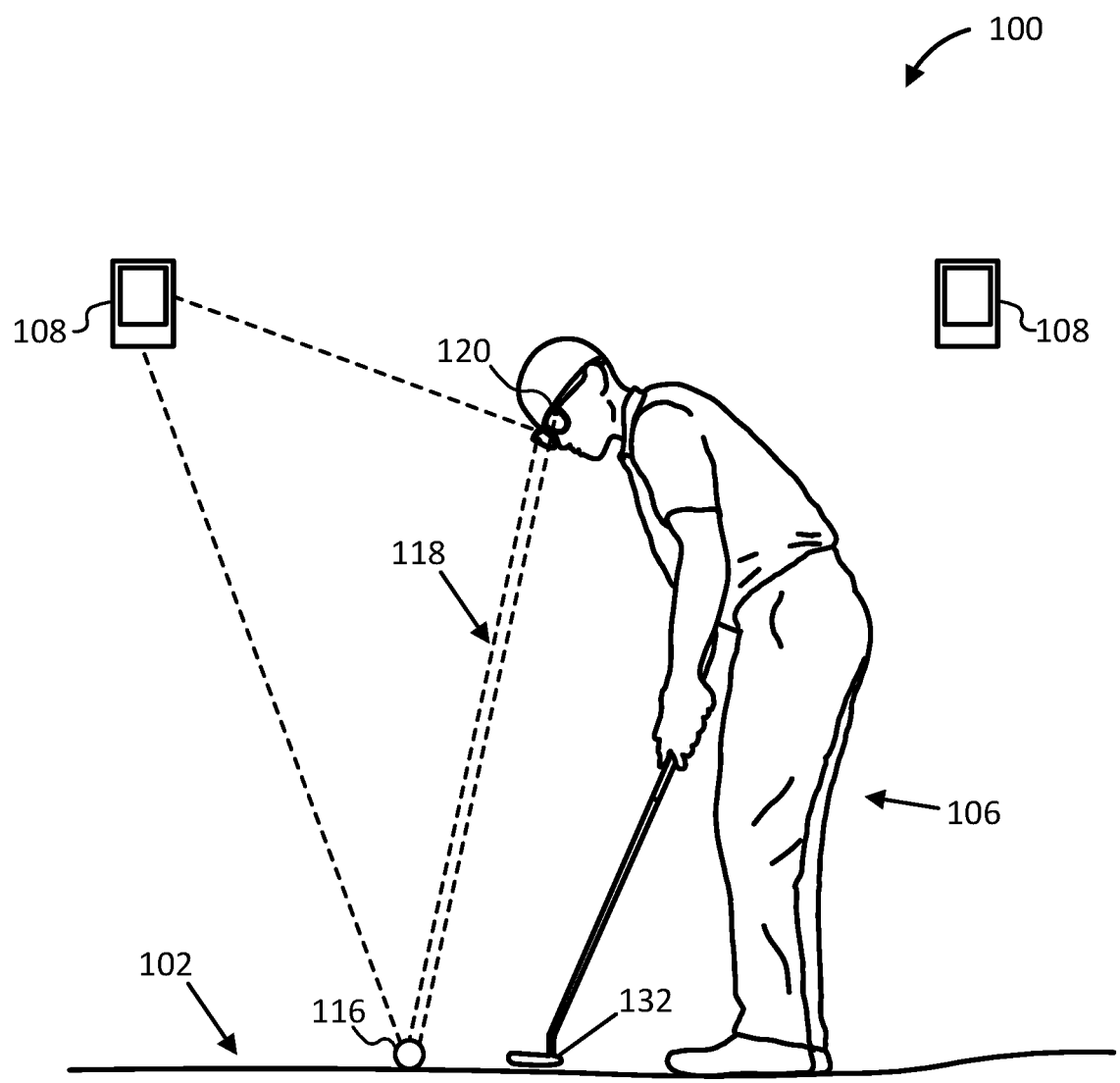
FIG. 2 depicts a schematic diagram of the miniature golf facility shown in FIG. 1 according to an embodiment of the present technology.

FIG. 1 depicts a perspective diagram of a miniature golf facility 100 according to an embodiment of the present technology. FIG. 2 depicts a schematic diagram of the miniature golf facility shown in FIG. 1 according to an embodiment of the present technology. Facility 100 includes a surface 102 (e.g., artificial grass or a carpet material) that is set apart from surrounding surfaces (e.g., those designed for heavier pedestrian traffic) by partitioning structures such as walls or barriers 103. Formed within a portion of surface is a hole 104, where a goal of playing the miniature golf game is for a player 106 to place a ball object 116 into hole 104 in as few strokes of the club 132 as possible. In an example, facility 100 may include a miniature golf course having a plurality of set apart "holes" (e.g., sub-course of the course having its own hole 104). Each hole may have a varying level of difficulty experience by any given player 106 in terms of an ease with which he or she is able to attain the ball object 116 into the respective hole 104. Such varying levels of difficulty may arise by design, include presence or absence of obstructions, inclines and declines, a length of each respective surface 102, and like physical/geometric factors.

An electronic gaming system 101 may be associated with one or more of the aforementioned holes in facility 100. System 101 includes a computing device 114, which may be a server computer in a distributed or cloud networked computing architecture. System 101 includes two or more beacon anchors 108 situated in facility 100 in stationary positions proximal the one or more holes of facility. Beacon anchor(s) 108 may be attached by way of a post 110 to a portion of surface 102 or wall 103 and/or anchor(s) 108 may be attached by way of a column 112 to a portion of a ceiling or like structure in facility 100. In some embodiments, system 101 includes one or more video cameras 107 having imaging sensor(s) such as RGB type digital camera components. Some such sensor(s) 107 used in system 101 may have night vision capability, and still others may include lighting for illuminating at least a portion of the one or more holes of the miniature golf course. Video camera(s) 107 may be situated in facility 100 in stationary positions proximal or otherwise in view of the one or more holes of facility 100. Imaging sensor(s) 107 may be attached by way of a post to a portion of surface 102 or wall 103 and/or sensor(s) 107 may be attached to a portion of a ceiling or like structure in facility 100, in like manner as how described above with reference to beacon anchors 108.

While so positioned in or proximal to the game space, video imaging sensor(s) 107 provide an effective field of view (FOV) 113 of at least a portion of the game space where object 116 is reasonably expected to be during game play using system 101. Unlike the video imaging sensor(s) of AR glasses 120 (e.g., 502 shown in FIG. 5), however, sensor(s) 107 are not movable around game space in some embodiments of the present technology, and so the FOV 113 of sensor(s) 113 is fixed. In this fixed FOV 113, physical features of game space are stationary, and may thereby serve a spatial reference points for one or more computer vision algorithms, as described in greater detail below. Video imaging sensor(s) 107 include digital and/or analog electronic components operatively coupled in communication with computing device 114, and may additionally include optical sensors for receiving and/or processing signals encoding data representative of the physical environment within the FOV 113 of sensor(s) 107. Computing device 114 and video imaging sensor(s) 107 may communicate data to and from each other using a wireless connection, a wired connection, or some combination of the two techniques.

Figure 4:
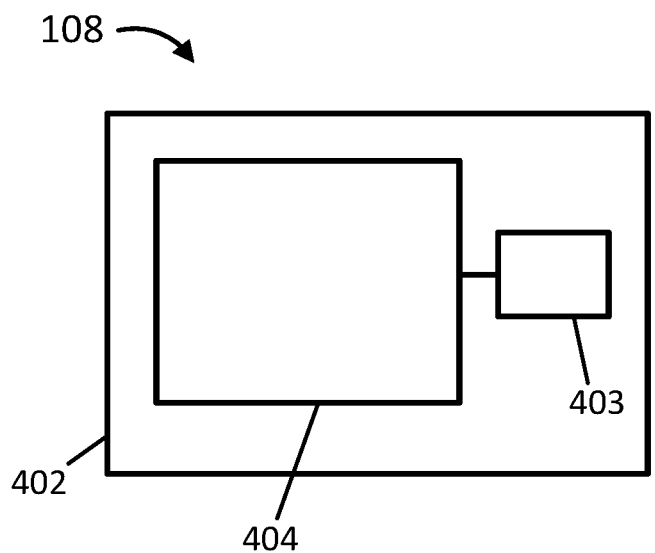
FIG. 4 depicts a schematic diagram of a beacon anchor apparatus according to an embodiment of the present technology that may be used in a gaming system with the miniature golf facility of FIGS. 1 and 2.

Computing device 114 and beacon anchors 108 are operatively coupled in communication with one another. Computing device 114 and beacon anchors 108 may communicate data to and from each other using a wireless connection, a wired connection, or some combination of the two techniques. Signals encoding data for use in the present technology are received and transmitted in system 101, as depicted by dashed lines in FIG. 1, as described in greater detail below. Referring to FIG. 4, a beacon anchor 108 (and any associated electronics 401 necessary for its operation, such as a power supply and a communications interface) includes a housing 402 and an antenna 404. Antenna 404 is capable of receiving, continuously or intermittently, a wireless signal from at least one beacon 117 associated with ball(s) 116.

In some embodiments, beacon anchors 108 may include analog and/or digital signal processing circuitry (not shown in FIG. 4) that conditions, decodes, or otherwise processes the wireless signal received from beacon(s) 116 prior to such data or signals representative thereof being relayed to the computing device 114 for purpose of, for instance, spatially tracking ball 116 in facility 100 during a game or miniature golf by player(s) 106 using gaming system 101. Likewise, video imaging sensor(s) 107 may include analog and/or digital signal processing circuitry (not shown in FIG. 1) that conditions, decodes, or otherwise processes the optical-based data of at least a portion of game space prior to such data or signals representative thereof being relayed to the computing device 114 for purpose of, for instance, spatially tracking ball 116 in facility 100 during a game or miniature golf by player(s) 106 using gaming system 101.

Figure 3:
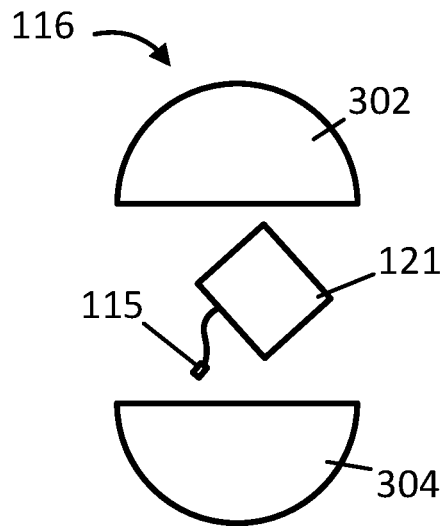
FIG. 3 depicts a schematic diagram of a golf ball apparatus according to an embodiment of the present technology that may be used in a gaming system with the miniature golf facility of FIGS. 1 and 2.

Referring to FIG. 3, a beacon device 117 (and any associated electronics 115 necessary for its operation) may be positioned in, or attached to, ball 116. In one embodiment, beacon device 117 is or includes a radio frequency identification (RFID) tag 121 capable of transmitting, continuously or intermittently, a wireless signal waveform with sufficient power to be received by antenna(s) 404 of the beacon anchor(s) 108 in facility 100. In the example shown in FIG. 3, ball 116 includes two at least partially hollow hemispheres 302 and 304, where RFID tag 121 is positioned in a resulting cavity inside ball 116, and where the hemispheres 302 and 304 are assembled together to secure RFID 121 inside ball 116 prior to play in the miniature golf game using system 101.

In embodiments where facility 100 includes a plurality of holes, and where a plurality of players 106 may engage in miniature golf games at the same time, multiple balls 117 being used concurrently may not only have differing colors to aid in players 106 identifying them for their own use (and to facilitate location tracking by, e.g., color blob detection of computer vision algorithm(s)), each of their respective RFID tag devices 117 may transmit wireless signals at distinct frequencies and/or with distinct modulations. This ensures that each ball object 116 may be uniquely identified for locational tracking and other game-related purposes according to the present, as described in greater detail below.

Figure 5:
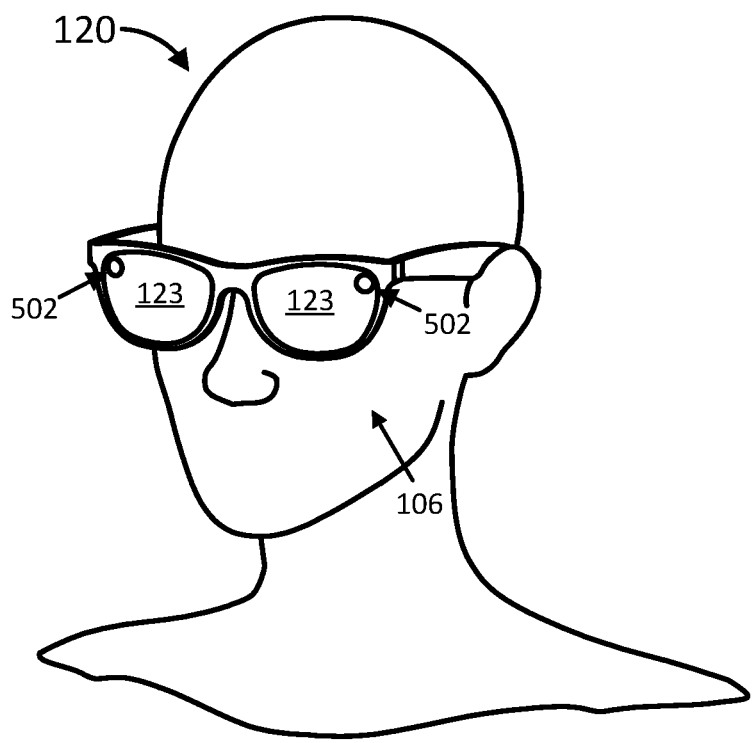
FIG. 5 depicts a diagram of an augmented reality (AR) apparatus in the form of AR glasses according to an embodiment of the present technology that may be used in a gaming system with the miniature golf facility of FIGS. 1 and 2.

Gaming system 101 includes one or more augmented reality (AR) devices, such as AR glasses 120, that are worn by player 106 whilst engaged in the game. While being so worn by player 106, AR glasses 120 provide an effective FOV 118 through lenses 123, in like manner as with sunglasses or prescription glasses. Thus, the FOV changes according to where the player's 106 gaze is directed in facility 100. AR glasses 120 include mechanical components similar to typical glasses people wear. AR glasses 120 further include electronic components 502 that enable various AR features in a miniature golf game according to the present technology, and as further described in detail below. At least a portion of these digital and/or analog electronic components of AR glasses 120 are operatively coupled in communication with computing device 114. Referring to FIG. 5, AR glasses 120 include digital and/or analog electronic components 502 such cameras, video imaging sensor(s), and/or other optical sensors for receiving and/or processing signals encoding data representative of the physical environment within the FOV 118 of player 106. Components 502 also include means for enabling player 106 to visualize computer-generated graphics, which may be embodied in a transparent screen (e.g., LED screen) occupying at least a portion of an interior (facing player's 106 eyes) or exterior (facing the same direction as the FOV 118) of the lenses 123 of AR glasses 120. In some embodiments, components 502 may also include means for enabling player 106 to hear computer-generated sounds that may be associated with the computer-generated graphics. In an example, the means for enabling player 106 to hear the computer-generated sounds may be embodied in a speaker subsystem, which may take the form of a speaker device or an earphone or earbud device. Such means for generated audible sounds for the player 106 may be integrated into the design of AR glasses 120 or may be separate equipment that may be detachably coupled to AR glasses 120 for use during game play using system 101 in facility 100.

As further described below, electronic components 502 of AR glasses 120 may include, for example and without limitation, processors, communications interfaces, antenna(s), and memory storage devices, and such other devices and subsystems required for operation of AR glasses 120 in practice of the present technology. What the player 106 sees through AR glasses 120 is what player 106 would typically see without AR glasses 120 according to where his or her gaze is directed. As described below in greater detail, AR glasses 120 provide the conduit by which AR gaming experiences may be enjoyed by players 106 utilizing gaming system 101, including having computer-generated graphics and sounds provided to him or her via AR glasses 120.

In some embodiments, gaming system 101 includes a mobile personal computing device such as a smartphone 122 operably coupled in communications with computing device 114. As described below in greater detail, a gaming application (also referred to herein as an "app") may be operated by players 106 via a touchscreen display 124 of smartphone 122 to enable or disable various features of gaming system 101. Smartphone 122 includes one or more digital and/or analog electronic components (e.g., processors, communications interfaces, antenna(s), and memory storage devices, not shown in FIG. 1) necessary for performing, implementing, and/or otherwise facilitating use of smartphone 122 in practice of the present technology.

Figure 6:
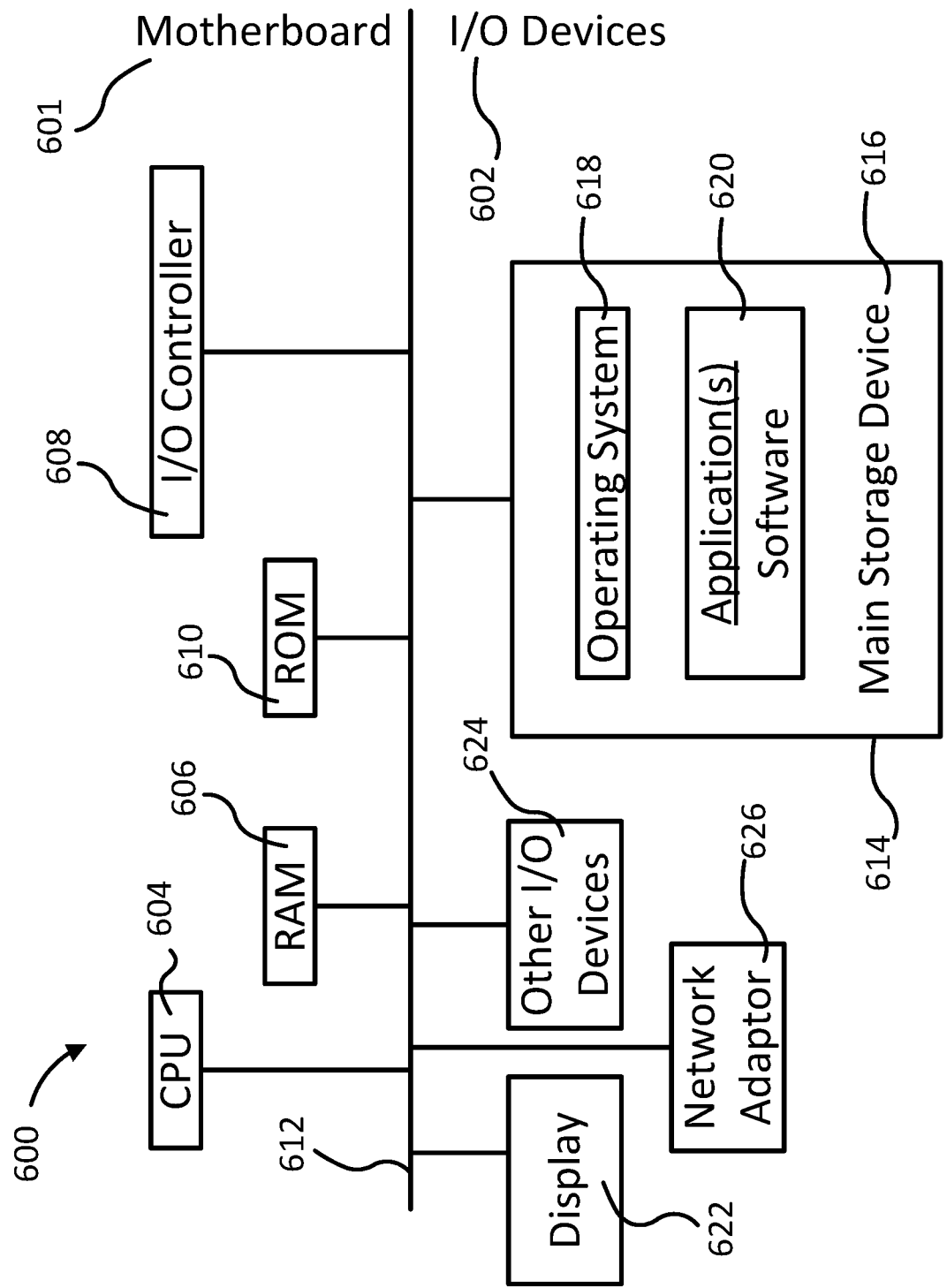
FIG. 6 depicts a block diagram of an example computing system that provides a suitable environment for implementing embodiments of the present technology.
Figure 7:
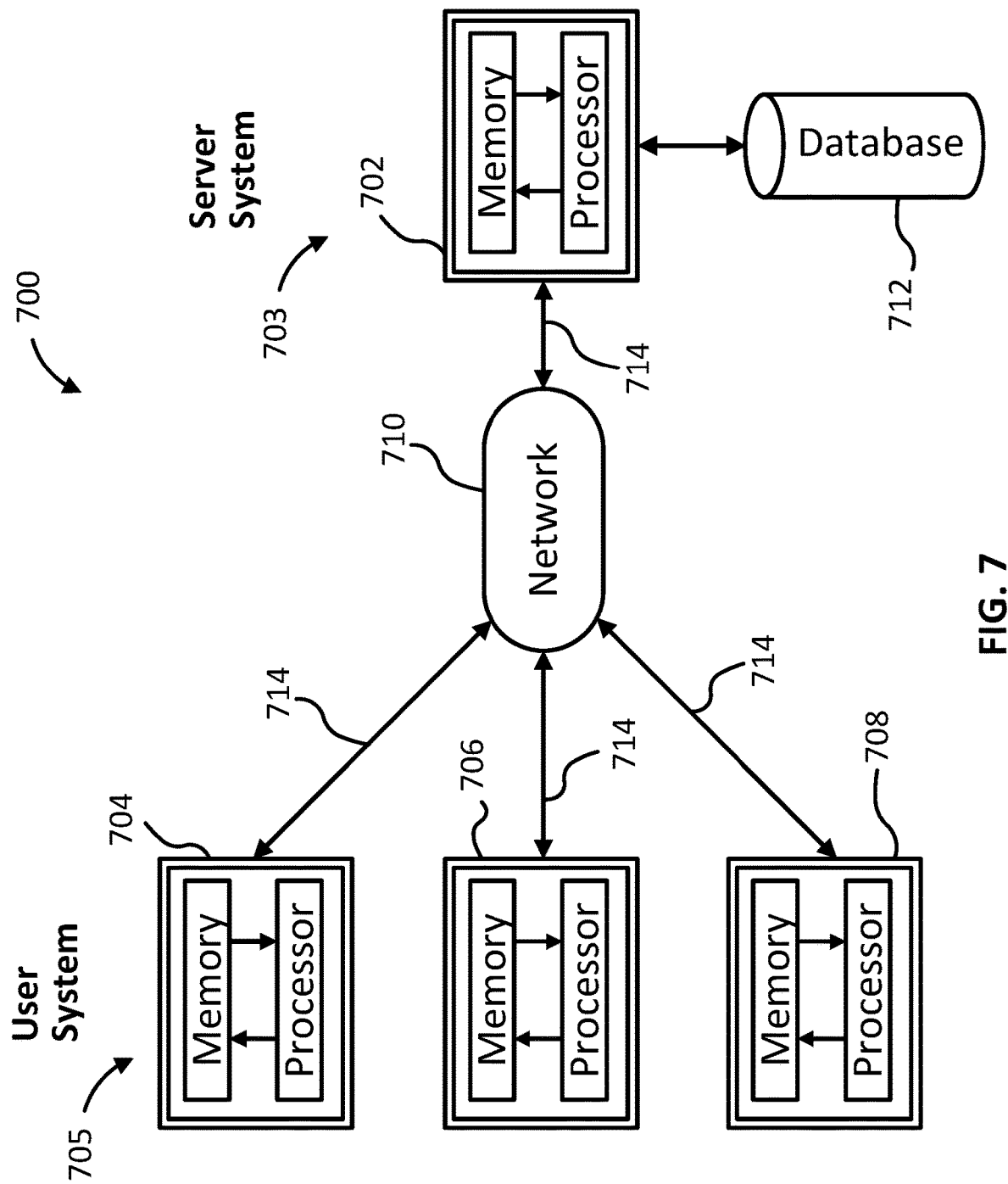
FIG. 7 depicts a block diagram of an example communication system that provides a suitable environment for implementing embodiments of the present technology.

In describing the exemplary embodiments of the present disclosure, as illustrated in FIGS. 6 and 7 for example, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a, e.g., non-transitory computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming languages may be utilized without departing from the spirit and intent of the present disclosure.

FIG. 6 depicts a block diagram of a computing system 600 that provides a suitable environment for implementing embodiments of the present technology. All or some of computing system 600 may be co-located with any of computing device 114, beacon(s) 108, video imaging sensor(s) 107, AR glasses 120, and ball 116, where such parts of the entirety of computing system 600 may be operably coupled in communication with one another through wired and/or wireless data communication lines. The computer architecture shown in FIG. 6 is divided into two parts—motherboard 601 and the input/output (I/O) devices 602. Motherboard 601 may include subsystems and/or processor(s) to execute instructions such as central processing unit (CPU) 604 (also referred to herein as "processor 604"), a memory device, such as random access memory (RAM) 606, I/O controller 608, and a memory device such as read-only memory (ROM) 610, also known as firmware, which are interconnected by bus 612. A basic input output system (BIOS) containing the basic routines that help to transfer information between elements within the subsystems of the computer may be stored in ROM 610, or operably disposed in RAM 606. Computing system 600 may further include I/O devices 614, such as main storage device 616 for storing operating system 618 and instructions or application program(s) 620 (e.g., as software "modules"), and display 622 for visual output, and other I/O devices 624 as appropriate. Main storage device 616 may be connected to CPU 604 through a main storage controller (represented as 608) connected to bus 612. Network adapter 626 (also referred to herein as communication interface) allows the computer system 600 to send and receive data through communication devices or any other network adapter capable of transmitting and receiving data over a communications link that is either a wired, optical, or wireless data pathway. It is recognized herein that CPU 604 performs instructions, operations or commands stored in ROM 610 or RAM 606.

Processor(s) 604 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 6 as a single processor, in some embodiments, processor 604 may comprise a plurality of processors with a plurality of CPUs 604. The plurality of processors 604 may be embodied on a single computing device or may be distributed across a plurality of computing devices collectively configured to function as the computing system 600 (e.g., at least two of computing device 114, video imaging sensor(s) 107, beacon(s) 108, AR glasses 120, and ball 116). The plurality of processors 604 may be in operative communication with each other and may be collectively configured to perform one or more functionalities of the computing system 600 as described herein. In an example embodiment, processor 604 is configured to execute instructions stored in memory 610, 606 or otherwise accessible to processor having CPU 604102. These instructions, when executed by processor 604, may cause the computing system 600 to perform one or more of the functionalities of the computing system 600 and/or the wider electronic gaming system 101 as described herein.

Whether configured by hardware, firmware/software methods, or by a combination thereof, processor 604 may comprise an entity capable of performing operations according to embodiments of the present invention while configured accordingly. Thus, for example, when processor 604 is embodied as an ASIC, FPGA or the like, processor 604 may comprise specifically configured hardware for conducting one or more operations described herein. As another example, when processor 604 is embodied as an executor of instructions, such as may be stored in memory 606, 610, the instructions may specifically configure processor 604 to perform one or more algorithms and operations described herein.

The plurality of memory components 606, 610 may be embodied on a single computing system 600 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 606, 610 may be configured to store information, data, applications, instructions, or the like for enabling the computing device 600 to carry out various functions in accordance with example embodiments discussed herein. For example, in at least some embodiments, memory 606, 610 is configured to buffer input data for processing by processor 604. Additionally or alternatively, in at least some embodiments, memory 606, 610 may be configured to store program instructions for execution by processor 604. Memory 606, 610 may store information in the form of static and/or dynamic information. This stored information may be stored and/or used by the computing device 600 during the course of performing its functionalities.

Many other devices or subsystems or other I/O devices 624 may be connected in a similar manner, including but not limited to, devices such as microphone, speakers, flash drive, CD-ROM player, DVD player, printer, main storage device 616, such as hard drive, and/or modem each connected via an I/O adapter. Also, although preferred, it is not necessary for all of the devices shown in FIG. 6 to be present to practice the present disclosure, as discussed below. Furthermore, the devices and subsystems may be interconnected in different configurations from that shown in FIG. 6, or may be based on optical or gate arrays, or some combination of these elements that is capable of responding to and executing instructions or operations. The operation of a computer system such as that shown in FIG. 6 is readily known in the art and is not discussed in further detail in this application, so as not to overcomplicate the present discussion.

In some embodiments, some or all of the functionality or steps may be performed by processor 604. In this regard, the example processes and algorithms discussed herein can be performed by at least one processor 604. For example, non-transitory computer readable storage media can be configured to store firmware, one or more application programs, and/or other software, which include instructions and other computer-readable program code portions that can be executed to control processors of the components of computing system 600 and/or communication system 700 (of FIG. 7) to implement various operations, including the examples shown above. As such, a series of computer-readable program code portions (e.g., modules) may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

FIG. 7 depicts a block diagram of an example communication system 700 that provides a suitable environment for implementing embodiments of the present technology. Examples of each element within the communication system 700 of FIG. 7 are broadly described above with respect to FIG. 6. In particular, a server system 703 and a user system 705 have attributes similar to computer system 600 of FIG. 6 and illustrate one possible implementation of computer system 600. Communication system 700 preferably includes one or more user systems 705 (e.g., 704, 706, 708), one or more server systems 703 (e.g., 702), and network 710, which could be, for example, the Internet, public network, private network or cloud. User systems 704, 706, 708 each preferably include a computer-readable medium, such as random access memory, coupled to a processor. Processor of user systems 705 executes program instructions or operations stored in memory. User systems 705 may include one or more general-purpose computers (e.g., personal computers), one or more special purpose computers (e.g., devices specifically programmed to communicate with each other and/or the server system(s) 703), a workstation, a server, a device, a digital assistant or a "smart" cellular telephone or pager, a digital camera, a component, other equipment, or some combination of these elements that is capable of responding to and executing instructions or operations.

Similar to user system(s) 705, server system 703 preferably includes a computer-readable medium, such as random access memory, coupled to a processor. The processor of server system 702, for example, executes program instructions stored in memory. Server system 702 may also include a number of additional external or internal devices, such as, without limitation, a mouse, a CD-ROM, a keyboard, a display, a storage device and other attributes similar to computer system 600 of FIG. 6. Server system 702 may additionally include a secondary storage element, such as database 712 for storage of data and information. Server system 702, although depicted as a single computer system, may be implemented as a network of computer processors. Memory in server system 702 contains one or more executable steps, program(s), algorithms), or application(s) 620 (shown in FIG. 6). For example, the server system 703 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communication system 700 is capable of delivering and exchanging data between user system 705 and a server system 703 through one or more communications link 714 and/or network 710. Through user system 705, users can communicate over network 710 with each other via user system(s) 705, and with other systems and devices, such as server system(s) 703, to electronically transmit, store, manipulate, and/or otherwise use data exchanged between the user system and the server system. Communications link(s) 714 may include network 710 making a direct or indirect communication between the user system 705 and the server system 703, without regard to physical separation. Examples of a network 710 include the Internet, cloud, analog or digital wired and wireless networks, radio, television, cable, satellite, and/or any other delivery mechanism for carrying and/or transmitting data or other information, such as to electronically transmit, store, manipulate, and/or otherwise modify data exchanged between the user system and the server system. The communications link(s) 714 may include, for example, a wired, wireless, cable, optical or satellite communication system or other pathway. It is contemplated herein that RAM 606, ROM 610, main storage device 616, and database 712 may be referred to herein as storage device(s) or memory device(s).

Figure 8:
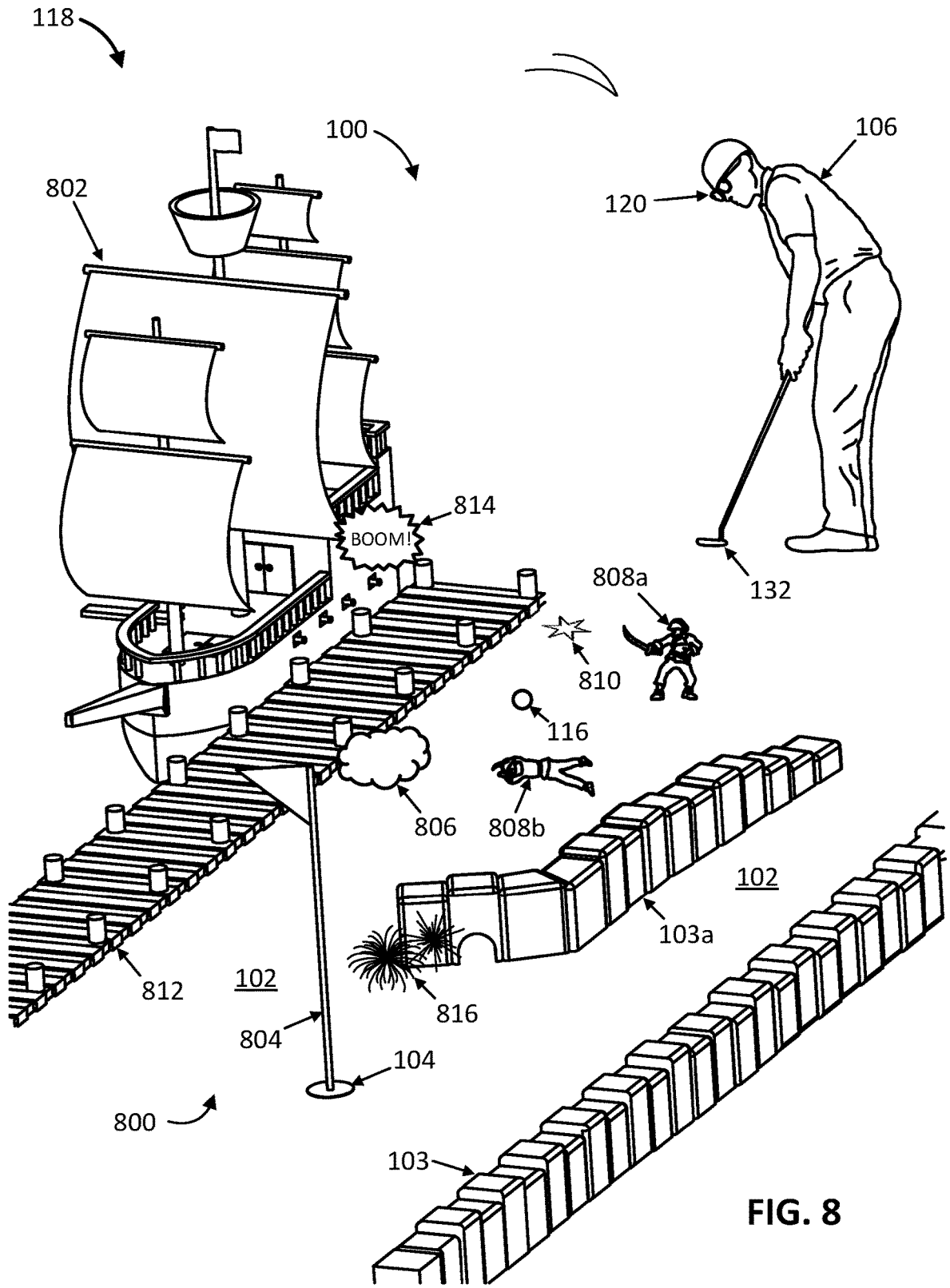
FIG. 8 depicts an example field of view in the miniature golf facility of FIGS. 1 and 2 of a game space from an AR apparatus worn by player of the gaming system according to an embodiment of the present technology.
Figure 9:
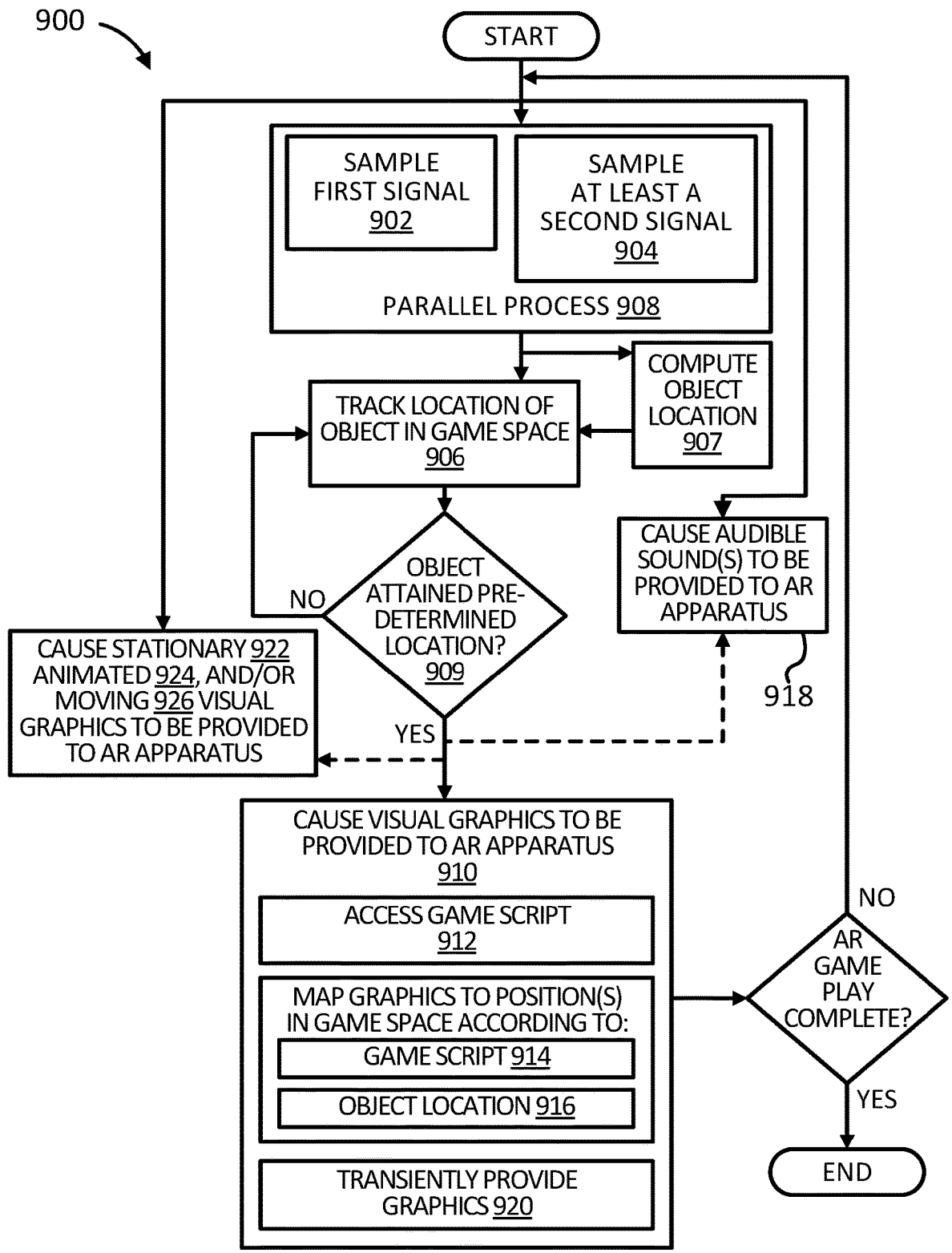
FIG. 9 depicts a flow chart of a method for operating a gaming system according to an embodiment of the present technology.

FIG. 8 depicts an example FOV 118 in the miniature golf facility 100 of FIGS. 1 and 2 of a game space from a player of the gaming system according to an embodiment of the present technology. FIG. 9 depicts a flow chart of a method 900 for operating a gaming system according to an embodiment of the present technology. In some embodiments, method 900 may be executed on computing device 114 to operate the AR gaming system 101.

Method 900 includes the step of sampling 902, e.g., by one or more processors of computing device 114 and via the communication interface, a first signal (e.g., signal(s) 161 shown in FIG. 1) encoding data representative of a location of a physical object 116 in a game space of the AR gaming system 101. The first signal including or encoding data representative of a location of object 116 may be received via the communication interface (e.g., network adapter 626 shown in FIG. 6) from respective sensor(s) or other analog and/or digital electronic components positioned in the game space. The first signal is, or originates from, a first sensor signal (e.g., signal 163 shown in FIG. 1) that identifies the object 116. In some embodiments, the object 116 is movable by a player in an AR game provided, at least in part, to the player by the AR gaming system 101.

Method 900 includes the step of sampling 904, e.g., by the processor(s) of computing device 114 and via the communication interface, at least a second signal (e.g., signal(s) 165 shown in FIG. 1) encoding data representative of the location of the object 116 in the game space. The second signal(s) including or encoding data representative of a location of object 116 may be received via the communication interface (e.g., network adapter 626 shown in FIG. 6) from respective sensor(s) or other analog and/or digital electronic components positioned in the game space. The at least a second signal is, or originates from, at least a second sensor signal (e.g., signal(s) 165 shown in FIG. 1) that identifies the object 116. In embodiments according to the present technology, the at least a second sensor is different from the first sensor.

Method 900 includes the step of tracking 906, e.g., by processor(s) of computing device 114, the location of the object 116 in the game space. The tracking 906 of the object 116 location—whether it be moving or not—is based upon the data representative of the location of the object 116 that is acquired, ascertained, or otherwise determined from the data encoded by both of the first, and the at least a second, signals. In an example, at least some of the data encoded by one or both of the first, and the at least a second, signal(s) directly provides the location of the object 116 to the processor(s) of computing device 114 without any additional processing thereby needed to compute the location of the object 116 in the game space. In another example, at least some of the data encoded by one or both of the first, and the at least a second, signal(s) does not directly provide the location of the object 116 to the processor(s) of computing device 114, and additional processing thereby is needed to compute the location of the object 116 in the game space. Accordingly, in such embodiments, method 900 may include the step of computing 907, e.g., by processor(s) of computing device 114, the location of the object 116 in the game space based on the data encoded by the first signal and/or the at least a second signal.

Tracking 906 the location of the object 116 using data from at least two different types of sensors positioned in the game space provides several technical and practical improvements and advantages as compared to known AR gaming systems. For instance, it enables a redundancy in tracking the location of the object 116 (e.g., a golf ball used in an AR miniature golf game), such that game play experience by player(s) 106 is not interrupted in the event that one of the at least two sensors experience technical difficulties during game play. Additionally, tracking 906 the location of the object 116 using data from at least two different types of sensors positioned in the game space enables efficient and responsive parallel processing to maximize object tracking and mapping accuracy of graphics to object/real world physical features and/or virtual (e.g., computer-generated) features in the game space.

Some embodiments of gaming system 101 enable computing device 114 to be configured for, or otherwise capable of, parallel processing two or more distinct and separate streams of data concurrently (e.g., system 101 having multiple processors or having multi-core processors, and the like). In such embodiments, the step of tracking 906 the location of the object 116 in the game space may include the step of parallel processing 908, e.g., by processor(s) of computing device 114, the data representative of the location of the object 116 from both of the first, and the at least a second, signals. As compared to known AR gaming systems, parallel processing 910 two or more data streams enables determining and tracking the location of the object 116 in the game space with higher speed, accuracy and precision, so as to improve the continuity of game play without interruptions or other "glitches" noticeable by player(s) 106 of the AR game. Such parallel processes also relate to the aforementioned technical and practical advantages and improvements in terms of redundancy in location tracking of the object 116.

Method 900 includes the step of causing 910, e.g., by processor(s) of computing device 114 and via the communication interface, at least one set of visual graphics to be provided to an AR apparatus (e.g., AR glasses 120) wearable by the player 106 during game play of the AR game. The processor(s) of computing device 114 may cause 910 the visual graphics to be provided to the AR glasses 120 by directing the communication interface to transmit a signal encoding data representative of the visual graphics (e.g., signal 165*a* shown in FIG. 1) to the AR glasses 120 for use by analog and/or digital electronic components (e.g., an on-board graphics processor). On-board graphics related elements of AR glasses 120 may responsively perform additional processing (e.g., decoding and other graphics-related processes) to enable the visual graphics to be visualized by the player 106 wearing the AR glasses 120, where the graphics are overlaid on what the player 106 sees through the AR glasses 120 in terms of real world physical features of the game space.

In embodiments according to the present technology, the causing 910 step is performed in response to the tracking 906 of the location of the object 116 in the game space. Implementation of the causing 910 step in method 900 may include the processor(s) of computing device 114 processing a logical branch 909, where processes for the causing 910 step are executed when the object 116 is determined, as by the tracking 906 step, to have attained a predetermined location in the game space, and where such processes are not executed when the tracking 906 determines that the object 116 has not attached the predetermined location.

Further with regard to implementation of the causing 910 step according to the present technology, many variations are possible and recognizable by persons of skill in the art. Some such variations are depicted in FIG. 8, which is referred to below from time to time to explain particular concepts and provide examples in practice of the present technology. In an embodiment, the method 900 step of causing 910, e.g., by one or more processors of computing device 114, the visual graphics to be provided to the AR apparatus includes the steps of: accessing 912, e.g., by one or more processors of computing device 114, a game script stored in memory for the AR game, and mapping 914, e.g., by one or more processors of computing device 114, the visual graphics to position(s) in the game space according to the game script. In an example, method 900 further includes the step of mapping 916, e.g., by one or more processors of computing device 114, the visual graphics to position(s) in the game space according to the location of the object. The game script may be provided by an AR game engine that can interface with computing device 114 via the I/O controller 608, for example. In some embodiments, the AR game engine facilitates the association of determined and tracked object locations in the game space with a pre-scripted rendering of visual graphics to the AR apparatus. Likewise, the AR game engine facilities provision of stationary, static, or moving graphics to the AR apparatus whose rendering may not be dependent on the determined/tracked locations of the object. FIG. 8 provides examples of each of these cases.

FIG. 8 shows a dynamic virtual overlay 800 with various sets or instances of computer-generated visual graphics. As shown at the right hand side of FIG. 8, a maritime theme including stationary graphics is overlaid on the actual real world physical structures of the game space in facility 101, as seen by a player 106 wearing AR glasses 120. A pirate ship 802 having several cannons is moored at a pier 812, where the pier 812 is overlaid onto one of the barrier 103 walls of the surface 102. From time to time during a game play experience, the pirate ship 802 fires a cannon ball onto the surface 102 of the hole shown in FIG. 8. An animated "boom" graphic 814 is transiently provided to the AR glasses 120 along with an audible "boom" type sound. A brief time after the commencement of the "boom" animated visual graphics 814 and the "boom" sound, another instance of animated visual graphics 810 is transiently provided to depict to the player 106 via their AR glasses 120 where on the surface 102 the cannon ball fired by the pirate ship 802 has landed. Graphics 810 may include a puff of smoke and make, like the firing of the cannon and graphics 814, be transiently accompanied by an explosion type sound.

In some embodiments, method 900 also includes the step of causing 918, e.g., by processor(s) of computing device 114 and via the communication interface, an audible sound to be provided to the AR apparatus. The audible sound may be background music, or a soundtrack specified by the player 106 during, or in advance of, game play in the AR game. The processor(s) of computing device 114 may cause 918 the audible sound(s) to be provided to the AR glasses 120 by directing the communication interface to transmit a signal encoding data representative of the audible sounds (e.g., signal 165*a* shown in FIG. 1) to the AR glasses 120 for use by analog and/or digital electronic components (e.g., an on-board audio processor, speaker(s), or the like). On-board audio-related elements of AR glasses 120 may responsively perform additional processing (e.g., decoding and other audio-related processes) to enable the audible sound to be heard by the player 106 wearing the AR glasses 120. In an example, the method 900 step of causing 918 the audible sound to be provided to the AR apparatus may include causing 918 the audible sound to be provided to the AR apparatus in response to the tracking 906 of the location of the object 116 in the game space.

In some embodiments, the method 900 step of causing 910 the visual graphics to be provided to the AR apparatus includes providing 920 (e.g., transiently) the visual graphics for a first predetermined period of time in response to the object attaining a predetermined location in the game space. In one example embodiment, the method 900 step of causing 918 the audible sound to be provided to the AR apparatus includes causing 918 the audible sound to be provided to the AR apparatus for a second predetermined period of time in response to the object 116 attaining the predetermined location in the game space. The first predetermined period of time may be the same as the second predetermined period of time. Alternatively, the first predetermined period of time may be different from the second predetermined period of time.

In addition to causing 910 visual graphics being provided to the AR apparatus in response to tracking 906 the location of the object 116 in the game space, embodiments of the present technology enable AR gaming experiences to be enhanced for player 106 enjoyment through provision of moving and/or stationary computer-generated graphics as, for example, an overlay on the real world physical features of the game space. In some embodiments, method 900 includes the step of causing 922, e.g., by processor(s) of computing device 114 and via the communication interface, stationary visual graphics to be provided to the AR apparatus (e.g., AR glasses 120). The processor(s) of computing device 114 may cause 922 the visual graphics to be provided to the AR glasses 120 by directing the communication interface to transmit a signal encoding data representative of the visual graphics (e.g., signal 165*a* shown in FIG. 1) to the AR glasses 120 for use by analog and/or digital electronic components (e.g., an on-board graphics processor). On-board graphics related elements of AR glasses 120 may responsively perform additional processing (e.g., decoding and other graphics-related processes) to enable the stationary visual graphics to be visualized by the player 106 wearing the AR glasses 120, where the stationary graphics are overlaid on what the player 106 sees through the AR glasses 120 in terms of real world physical features of the game space.

In an embodiment, the method 900 step of causing 910 the visual graphics to be provided to the AR apparatus may include causing 924, e.g., by processor(s) of computing device 114 and via the communication interface, animated visual graphics to be provided to the AR apparatus. The processor(s) of computing device 114 may cause 924 the visual graphics to be provided to the AR glasses 120 by directing the communication interface to transmit a signal encoding data representative of the animated visual graphics (e.g., signal 165*a* shown in FIG. 1) to the AR glasses 120 for use by analog and/or digital electronic components thereof (e.g., an on-board graphics processor). On-board graphics-related elements of AR glasses 120 may responsively perform additional processing (e.g., decoding and other graphics-related processes) to enable the animated visual graphics to be visualized by the player 106 wearing the AR glasses 120, where the graphics are overlaid on what the player 106 sees through the AR glasses 120 in terms of real world physical features of the game space.

In an example according to the present technology, method 900 may include the step of determining, e.g., by processor(s) of the computing device 114, that the location of the object 116 in the game space is at, or within a predetermined distance of, at least one instance of the visual graphics (e.g., provided by the causing 910 step). In one embodiment, the method 900 step of causing 924 the animated visual graphics to be provided to the AR apparatus may include causing 924 the animated visual graphics to be provided to the AR apparatus in response to determining that the location of the object 116 in the game space is at, or within a predetermined distance of, at least one instance of the visual graphics.

In some embodiments, method 900 includes the step of causing 926, e.g., by processor(s) of computing device 114 and via the communication interface, moving visual graphics to be provided to the AR apparatus (e.g., AR glasses 120). The processor(s) of computing device 114 may cause 926 the visual graphics to be provided to the AR glasses 120 by directing the communication interface to transmit a signal encoding data representative of the visual graphics (e.g., signal 165*a* shown in FIG. 1) to the AR glasses 120 for use by analog and/or digital electronic components (e.g., an on-board graphics processor). On-board graphics related elements of AR glasses 120 may responsively perform additional processing (e.g., decoding and other graphics-related processes) to enable the moving visual graphics to be visualized by the player 106 wearing the AR glasses 120, where the moving graphics are overlaid on what the player 106 sees through the AR glasses 120 in terms of real world physical features of the game space.

In an example according to the present technology, method 900 may include the step of determining, e.g., by processor(s) of the computing device 114, that the location of the object 116 in the game space is at, or within a predetermined distance of, at least one instance of the moving visual graphics (e.g., provided by the causing 926 step). In one embodiment, the method 900 step of causing 910 the visual graphics to be provided to the AR apparatus may include causing 910 the visual graphics to be provided to the AR apparatus in response to determining that the location of the object 116 is at, or within a predetermined distance of, the moving visual graphic(s). Operations such as these in method 900 may include processor(s) of computing device 114 performing processes equivalent, or at least similar or analogous to, the aforementioned processing associated with logical branch 909.

Examples of how the AR gaming engine facilitates operations such as these in method 900 are provided in FIG. 8. To the left of a surface 102 dividing barrier 103*a* wall and in the upper left-hand quadrant of the hole are shown two figures as pirates 808, where pirate 808*a* is upright and walking toward the left, and where pirate 808*b* is lying prone. As can be appreciated from FIG. 8, ball object 116 was just putted by player 106 and did attain a location on surface 102 in the game space that was within a predetermined distance from a formerly standing and walking pirate 808*b*. The previous instance of moving visual graphics in the form of walking pirate 808*b* changed to another form of animated graphics—pirate 808*b* being blasted by the ball object 116 and then being thrown some distance away from the point of contact and knocked down onto surface 102—according to the location of the ball object 116 and the game script. The aforementioned pirate 808*b* blasting sequence of animated visual graphics includes a puff of smoke 806, and may further be accompanied by a transient blasting type sound.

FIG. 8 provides another example of how the AR gaming engine facilitates operations including, or similar, analogous, or relating, to the causing 610 step of method 900. At the bottom of FIG. 8 is shown another instance of stationary visual graphics in the form of a hole flag 804 that appears to hover just above the physical real world hole 104. Ball object 116 is shown on a trajectory after being putted by player 106 that is not likely to result in a hole-in-one. A subsequent putt by player 106 resulting in the ball object 116 entering the hole 104 may result in additional instances of transient animated graphics and accompanying sounds (e.g., "hooray") to be provided to the AR glasses 120. One such instance of animated graphics in this case could be fireworks 816 shooting upward and bursting at or near the hole flag 804 and/or the hole flag 804 lighting up in one or more colors and also flashing.

The process steps executed, at least in part, by the computing device 114 in method 900 utilize data representative of the location of the object 116 in the game space. By receiving data streams from two or more sensor types positioned in the game space, object 116 location computations are more reliable and more accurate as compared to at least some known AR gaming systems. Accordingly, several variations are possible in method 900 for the originating source of data representative of the location of the object 116 in the game space.

In some embodiments according to the present technology, the first sensor for the sampling 902 step of method 900 includes at least two beacon anchors 108 positioned in the game space, where the first signal is, or originates from, a beacon signal that identifies the object 116 in the game space. The object 116 includes the beacon 117 that transmits the beacon signal, as described in greater detail, above. Accordingly, the sampling 902 step of method 900 may include the step of receiving, by the processor(s) of computing device 114 and via the communication interface, the first signal from the at least two beacon anchors. The processor(s) of computing device 114 may receive the first signal by directing the communication interface to receive the first signal at a predetermined rate (e.g., sampling frequency), where the first signal may be continuously or intermittently transmitted into the game space by the beacon 117 and/or the beacon anchors 108. In an example, the computing device 114 may responsively perform additional processing (e.g., decoding and other computational processes) to compute 907 the location of the object 116 in the game space. Accordingly, method 900 may include the step of determining, e.g., by processor(s) of the computing device 114, the location of the object 116 in the game space based upon the data representative of the location of the object from the first signal from the beacon anchors 108 using, for example and without limitation, a trilateration or triangulation algorithm. In the case of trilateration, the processor(s) of computing device 114 determine the location of the object 116 (stationary or moving) in the game space using multiple ranges between the object 116 and multiple spatially-separated known locations in the physical environment of the game space (e.g., of facility 100 in or near the hole). Ranges computed may account for angles of incidence of RFID/beacon signals in some embodiments.

Figure 10:
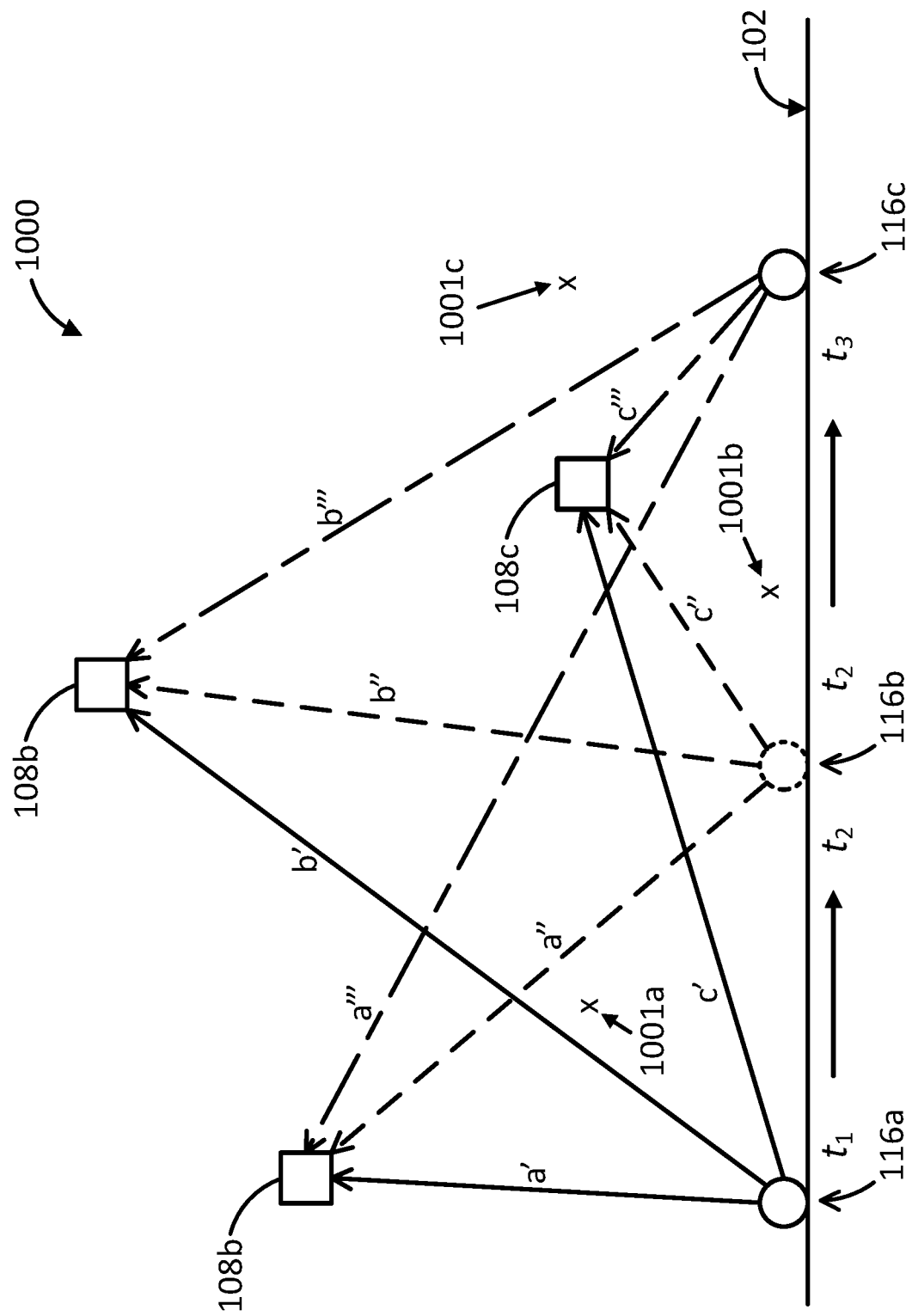
FIG. 10 depicts a schematic diagram of an example trilateration algorithm that can be used in embodiments of the present technology.

FIG. 10 depicts an example of a trilateration algorithm 1000 that can be used in embodiments of the present technology. As shown in FIG. 10, a ball object 116 is moving rightward on surface 102 and over a period of time, attains three different positions on surface 102 in consequence of its movement—116a at time 1, 116b at time 2, and 116c at time 3. At each of those times, RFID tag 117 is emitting its uniquely identifying wireless signals which are received at the three times by three beacon anchors 108a, 108b and 108c, which are positioned in known locations in the facility 101 at, or proximal to, the hole having surface 102. At the first time, the beacon anchors 108a, 108b and 108c may determine the time of arrival (TOA) and, optionally, the angle of arrival (AOA), of respective beacon signals denoted in FIG. 10 as a', b' and c' Likewise, at the second time, the beacon anchors 108a, 108b and 108c may determine the TOA and, optionally, the AOA, of respective beacon signals denoted in FIG. 10 as a", b" and c". Similarly, at the third time, the beacon anchors 108a, 108b and 108c may determine the TOA and, optionally, the AOA, of respective beacon signals denoted in FIG. 10 as a''', b''' and c'''.

With the TOA being proportional to the range, or distance, between the respective beacon anchor 108 and ball object 116 at the respective times, and further with the beacon anchors 108 affixed at known positions in facility 101 with distances between them, and between other known reference points 1001a, 1001b and 1001c, thus being known, the location of the object 116 at each time can then be computed, and further correlated to game scripts that rely, at least in part, on the location of the object 116 and also corresponding positions on the surface 102 and other parts of the hole like barrier(s) 103. Naturally, the smaller the amount of time between sampling points, the higher the resolution of the location tracking 906 in method 900. Use of AOA along with TOA in computing and tracking object 116 location in game space may further enhance the tracking 906 resolution. To aid in accommodating high sampling rates or frequencies to facilitate high resolution tracking, beacon anchors 108 may utilize an ultra-wide bandwidth network connection with the computing device 114 (not shown in FIG. 10). Various other examples of trilateration and triangulation techniques are expected to be recognizable and appreciated by persons of skill in the art, and such other techniques and associated algorithms may be suitably utilized for the present technology without departing from the scope and spirit of the disclosure and appended claims.

In some embodiments according to the present technology, the at least a second sensor for the sampling 904 step of method 900 includes at least one video imaging sensor of the AR apparatus (e.g., sensor(s) 502 of AR glasses 120), where the at least a second signal is, or originates from, an optical signal that identifies the object 116. Accordingly, the sampling 904 step of method 900 may include the step of receiving, by the processor(s) of computing device 114 and via the communication interface, the at least a second signal from the AR apparatus. The processor(s) of computing device 114 may receive the at least a second signal by directing the communication interface to receive the at least a second signal at a predetermined rate (e.g., sampling frequency), where the at least a second signal may be continuously or intermittently transmitted by a transmitter or communication interface of the AR apparatus. In an example, the computing device 114 may responsively perform additional processing (e.g., decoding and other computational processes) to compute 907 the location of the object 116 in the game space. Accordingly, method 900 may include the step of determining, e.g., by processor(s) of computing device 114, the location of the object 116 in the game space based upon the data representative of the location of the object from the at least a second signal from the AR apparatus using, for example and without limitation, a computer vision algorithm.

In some embodiments according to the present technology, the at least a second sensor for the sampling 904 step of method 900 includes at least one video imaging sensor 107 (different from the video imaging sensor(s) 502 of the AR apparatus) positioned in the game space, where the at least a second signal is, or originates from, an optical signal that identifies the object 116. Accordingly, the sampling 904 step of method 900 may include the step of receiving, by the processor(s) of computing device 114 and via the communication interface, the at least a second signal from the video imaging sensor(s) 107. The processor(s) of computing device 114 may receive the at least a second signal by directing the communication interface to receive the at least a second signal at a predetermined rate (e.g., sampling frequency), where the at least a second signal may be continuously or intermittently transmitted by a transmitter or communication interface of the video imaging sensor(s) 107. In an example, the computing device 114 may responsively perform additional processing (e.g., decoding and other computational processes) to compute 907 the location of the object 116 in the game space. Accordingly, method 900 may include the step of determining, e.g., by processor(s) of computing device 114, the location of the object 116 in the game space based upon the data representative of the location of the object 116 from the at least a second signal from the video imaging sensor(s) 107 using, for example and without limitation, a computer vision algorithm.

In some embodiments according to the present technology, the at least a second sensor for the sampling 904 step of method 900 includes: at least one first video imaging sensor (e.g., sensor(s) 502 of AR apparatus) positioned in at least a first location in the game space, and at least one second video sensor (e.g., sensor(s) 107) positioned in at least a second location in the game space. In such embodiments, the at least a second signal may include: a second signal, and a third signal. The second signal is, or originates from, a first optical signal (e.g., signal 165*a*) that identifies the object 116, and the third signal is, or originates from, a second optical signal (e.g., signal 165*b*) that identifies the object 116. Accordingly, the sampling 904 step of method 900 may include the step of receiving, by the processor(s) of computing device 114 and via the communication interface: the second signal from the first video imaging sensor(s) (e.g., 502) and the third signal from the second video imaging sensor(s) 107. The processor(s) of computing device 114 may receive the at least a second and third signals by directing the communication interface to receive the second and/or third signals at a predetermined rate (e.g., sampling frequency), where the second and/or third signal(s) may be continuously or intermittently transmitted by transmitter(s) and/or communication interface(s) of the first (e.g., 502) and/or second 107 video imaging sensor(s). In an example, the computing device 114 may responsively perform additional processing (e.g., decoding and other computational processes) to compute 907 the location of the object 116 in the game space. Accordingly, method 900 may include the step of determining, e.g., by processor(s) of computing device 114, the location of the object 116 in the game space based upon both of: the data representative of the location of the object 116 from: the second signal from the first video imaging sensor(s) (e.g., 502) using at least one computer vision algorithm, and the third signal from the second video imaging sensor(s) 107 using the at least one computer vision algorithm.

The at least one computer vision algorithm may include: a first computer vision algorithm, and a second computer vision algorithm. In an example, determining the location of the object based upon the data representative of the location of the object 116 from the second, and third, signals using the at least one computer vision algorithm may include both of: (i) determining the location of the object 116 in the game space using the first computer vision algorithm based upon the data representative of the location of the object 116 from the second signal, and (ii) determining the location of the object 116 in the game space using the second computer vision algorithm based upon the data representative of the location of the object 116 from the third signal. In the example, the first and second computer vision may be different, or they may be the same.

Video imaging sensors (502 and/or 107) take as inputs light from their respective FOVs and generate pixel-based data including color of an image frame. A sequence of frames sampling at a rate or frequency produces, after additional processing like decoding and related operations, a video as a series of images. Color blob detection relies on analyzing images including in videos to identify and track particular subsets or groups of pixels, where the pixels are of the same, or very similar color. Accordingly, a frame of pixels having a number depending on the resolution of the imaging sensor yields a data set that characterizes the pixels of the frame based on qualities of the aforementioned input light at any given time. Thus, as used herein, the phrase "optical signal" and the like means data that is derived from the process of generating pixel data sets based on underlying optical inputs from the ambient environment of the imaging sensor(s) (e.g., 107 and/or 502).

In some embodiments, the subset of pixels that comprises a color blob may be further characterized in terms of shape. This may be particularly useful in the case of symmetrically a golf ball object 116 where, despite the angle from which it is view, retains substantially the same circular shape in a two dimensional (2D) image frame. Furthermore, miniature golf course greens of uniform color provide a suitable background against a golf ball object 116 with a color (e.g., white, yellow, orange) that contrasts highly with the green (or other darker colored) surface 102 of the hole. For similar reasons, miniature golf course hole surfaces of a light color (e.g., white or yellow) and golf ball objects 116 having a darker color (e.g., green, blue, black) provide such a suitable background for color blob detection-based computer vision algorithms.

Figure 11:
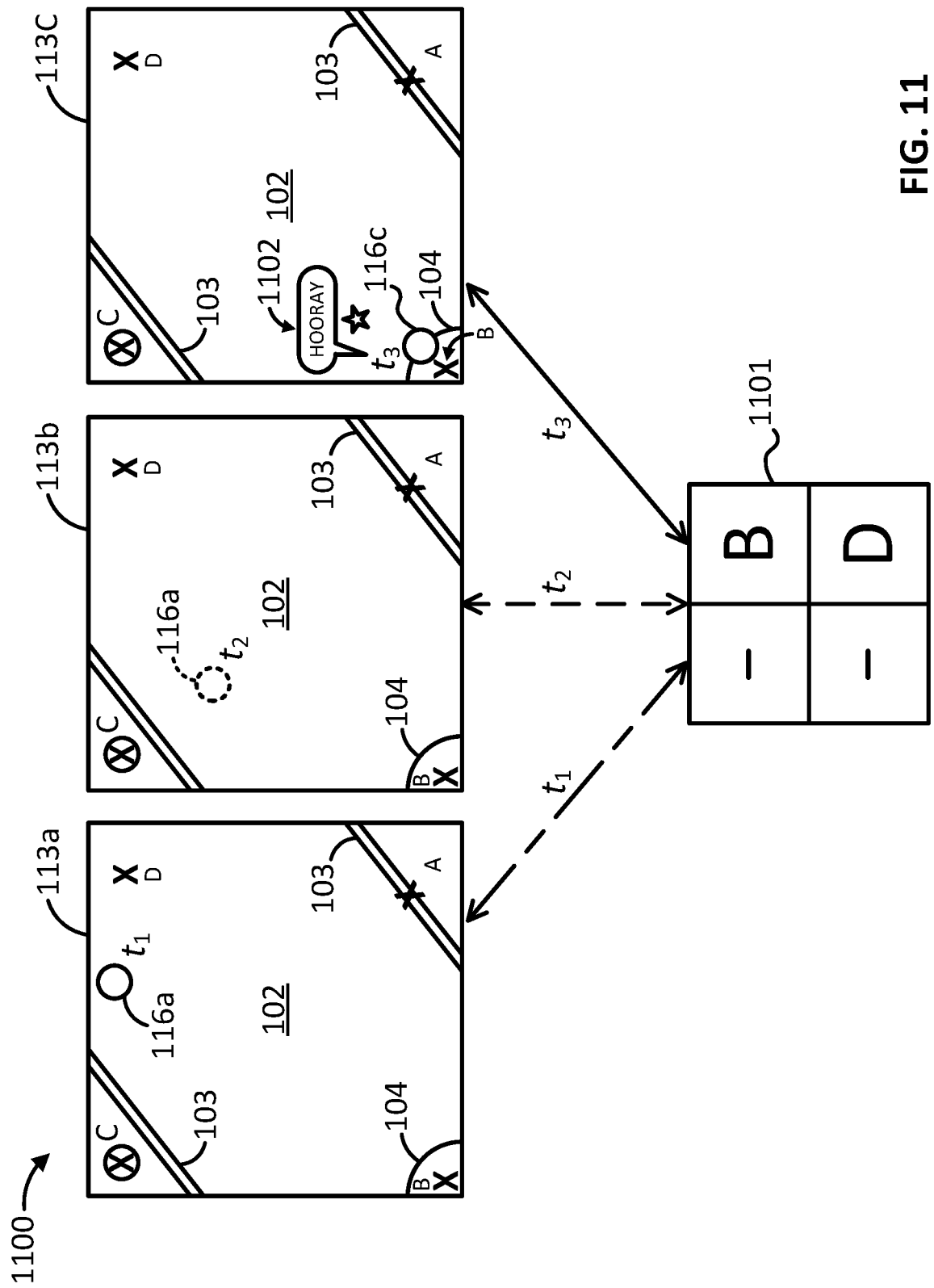
FIG. 11 depicts a schematic diagram of an example computer vision algorithm utilizing color blob detection in combination with the game script for mapping visual graphics to positions in the game space that can be used with embodiments of the present technology.

In the case of fixed FOV 113 video imaging sensor(s) 107 in facility 101, known positions in the physical environment of facility 101 at or proximal to the hole provide an effective means for mapping the visual graphics to position(s) in the game space according to both the game script and the object location in method 900. FIG. 11 depicts a schematic diagram of an example computer vision algorithm 1100 utilizing color blob detection in a computer vision algorithm in combination with a game script 11001 for mapping of visual graphics (e.g., 1102) to positions in the game space that may be used with embodiments of the present technology. In the example, the ball object 116 is a color blob that provides a ground of pixels in the FOV 113 that is of a highly contrasted color as compared to the surface 102 between the barriers 103, and which also presents a uniform and substantially symmetrical and non-varying shaping in the FOV 113 for each of three frames thereof (e.g., 113*a*, 113*b*, 113*c*).

As shown in FIG. 11, within each of the three FOV frames 113*a*, 113*b* and 113*c*, fixed positions in the physical environment of the game space are present and distinguishable to the video imaging sensor(s) 107. Four such fixed positions are denoted in FIG. 11 as points A, B, C and D, where point B is at the hole 104. As shown in FIG. 11, the ball object 116 is moving on surface 102 toward hole 104 and over a period of time, attains three different positions on surface 102 in consequence of its movement—116*a* at time 1, 116*b* at time 2, and 116*c* at time 3. At each of those times, the computer vision algorithm color blob detection operates to track the location of the ball object 116 in the respective FOV 113 frame. Further, given that the fixed points A-D of known spatial positions are present in each of the FOV 113 frames, the computer vision algorithm color blob detection also operates to track the location of the ball object 116 in the game space physical environment. Naturally, the higher the resolution (pixels per unit of sensor area and/or frames per second) of the video imaging sensor(s) 107 observing the FOV 113 shown in FIG. 11, the higher the resolution of the location tracking 906 in method 900. In some embodiments of the present technology, video imaging sensor(s) 107 may be embodied in one or more stereo video imaging sensors 107, such as ZED Cameras commercially available from STEREOLABS. In other embodiments, the video imaging sensor(s) 107 may be embodied in one or more KINECT cameras commercially available from MICROSOFT.

In the example of FIG. 11, a game script 1101 is represented in a simplified fashion as a matrix or look-up table, where the game script 1101 can provide four different and distinct instances of visual graphics via the causing 910 and similar steps of method 900 during game play by a player 106 in an AR miniature golf game. There are four entries for four different game space locations in the matrix or look-up table representation of game script 1101, where each of the four locations is associated with a different and distinct instance or set of visual graphics. In the example of FIG. 11, only two of the points (B and D) of game script 1101 correspond to fixed known locations in the game space of FOV 113.

At time 1 and time 2, the ball object 116 is not at, or within a predetermined distance of, locations of points B and D. At time 3, however, the ball object 116 sinks into the hole 104, whereupon the object 116 location maps to a corresponding location (point "B" within hole 104), and the processor(s) of, for example and without limitation, computer device 114 maps the associated visual graphics to point B in the game space and to a corresponding set of pixels or other effective means in the AR glasses 120. The visual graphics 1102 (an animated caption saying "hooray" and associated audible sounds) are then caused to be provided to the AR glasses 120 per the disclosed method 900. Thus, the visual graphics of the example shown in FIG. 11 are mapped to the game space and to the visualizing means of AR glasses 120 according to the game script 1102 and according to the current location of the golf ball object 116 at or near point B.

To aid in accommodating high sampling rates or frequencies to facilitate high resolution object location tracking 906 in method 900, video imaging sensor(s) (107 and/or 502) may utilize an ultra-wide bandwidth network connection with the computing device 114 (not shown in FIG. 11). Various other examples of computer vision algorithms and color blob detection techniques are expected to be recognizable and appreciated by persons of skill in the art, and such other techniques and associated algorithms may be suitably utilized for the present technology without departing from the scope and spirit of the disclosure and appended claims.

Figure 12:
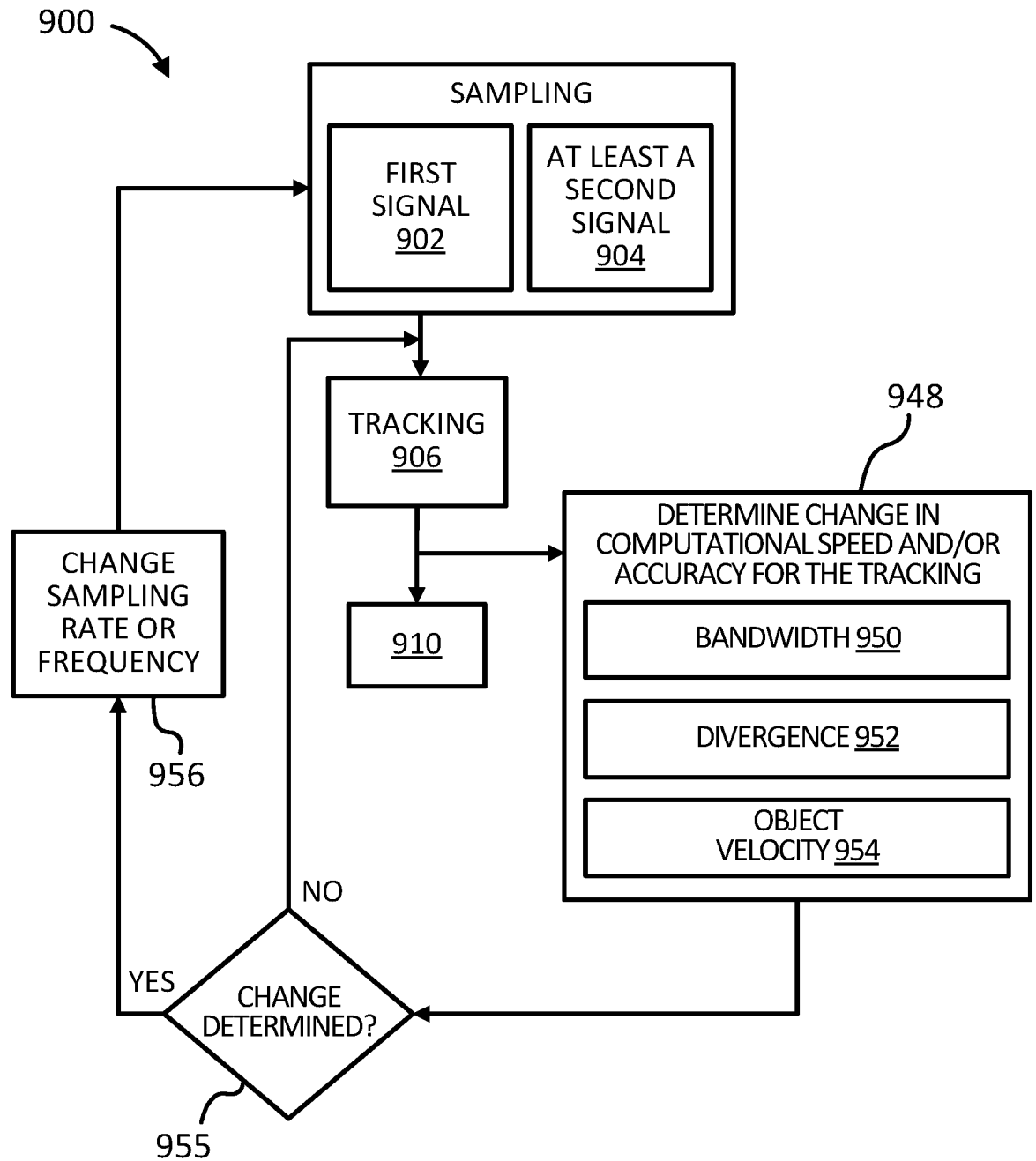
FIG. 12 depicts a flow chart of a method for operating a gaming system according to an embodiment of the present technology.

Turning to FIG. 12, and with continued reference to FIGS. 9-11, method 900 may further include the step of determining 948, e.g., by processor(s) of the computing device 114, a change in computational speed and/or accuracy for the tracking 906 step. In practice, the computational speed and/or accuracy of the tracking 906 may change or vary based on one or more of several phenomena, which may or may not be intentionally introduced by an operator of AR gaming system 101. As such, although in operation of system 101 the determining 948 step may be automatically performed, in some instances, the determining 948 step may be implemented manually by the operator of system 101 for purposes such as testing, debugging and/or calibration, among others.

Accordingly, in one example, the determining 948 step of method 900 may include determining 950, e.g., by processor(s) of the computing device 114, a change (e.g., beyond a predetermined magnitude, such as ±10% or ±5% or ±1% or ±0.1% or ±0.01%) in network (e.g., 710) bandwidth for at least one of: the sampling 902 of the first signal, and the sampling 904 of the at least a second signal. In another example, the determining 948 step of method 900 may include determining 952, e.g., by processor(s) of the computing device 114, a divergence (e.g., beyond a predetermined tolerance, such as ±10% or ±5% or ±1% or ±0.1% or ±0.01%) of computed results for the location of the object 116 in the game space as between the data representative of the location of the object 116 from both of the first, and the at least a second, signals. In yet another example, the determining 948 step of method 900 may include determining 954, e.g., by processor(s) of the computing device 114, a change (e.g., beyond a predetermined magnitude, such as ±10% or ±5% or ±1% or ±0.1% or ±0.01%) in an average velocity at which the object 116 moves in the game space. In still another example, the determining 948 step of method 900 may include any combination of two or more of the aforementioned determining steps 950, 952, and 954.

In one embodiment according to the present technology, method 900 may include the step of changing 956, e.g., by processor(s) of computing device 114, and in response to the above-described determining 948, a sampling rate or frequency of the sampling 902 of the first signal. Implementation of the changing 956 step in method 900 may include the processor(s) of computing device 114 processing a logical branch 955, where processes for the changing 956 step are executed when a change is determined 948, and where such processes are not executed when a change is not determined 948. In another embodiment according to the present technology, the changing 956 step method 900 may include changing, e.g., by processor(s) of computing device 114, and in response to the determining 948, a sampling rate or frequency of the sampling 904 of the at least a second signal. In yet another embodiment according to the present technology, the changing 956 step method 900 may include changing, e.g., by processor(s) of computing device 114, and in response to the determining 948, the sampling rate or frequency of both of: the sampling 902 of the first signal, and the sampling 904 of the at least a second signal. These aspects of method 900 and of the present technology may enable flexible and responsive, yet automatically implemented, approaches that reduce glitches and enhance player 106 experiences in the AR game, including on account of the technical performance capabilities of AR gaming system 101 equipment and networks utilized by it, as well as preferences of players 106 and/or AR gaming system 101 operators.

Figure 13C:
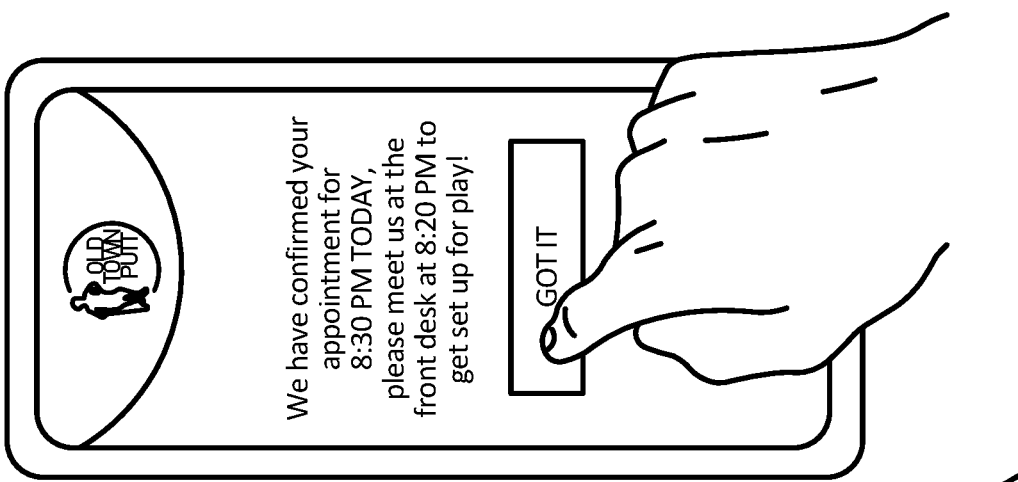
FIGS. 13A to 13C depict screenshots of a gaming application according to an embodiment of the present technology that may be used to facilitate game play and game-related features for the player using the gaming system in the miniature golf facility of FIGS. 1 and 2.
Figure 13B:
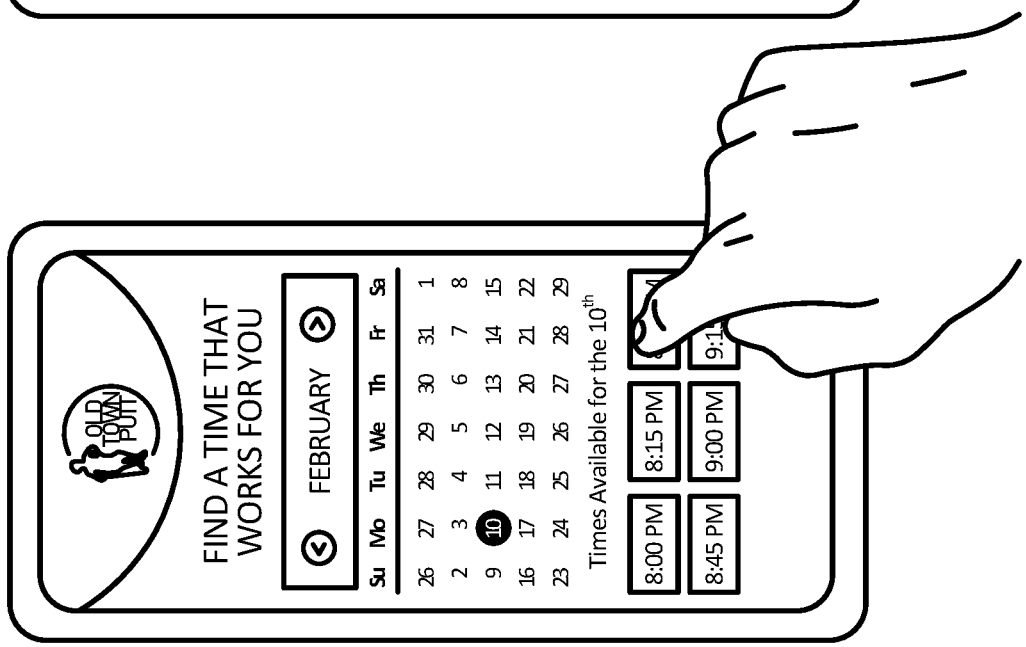
Figure 13A:
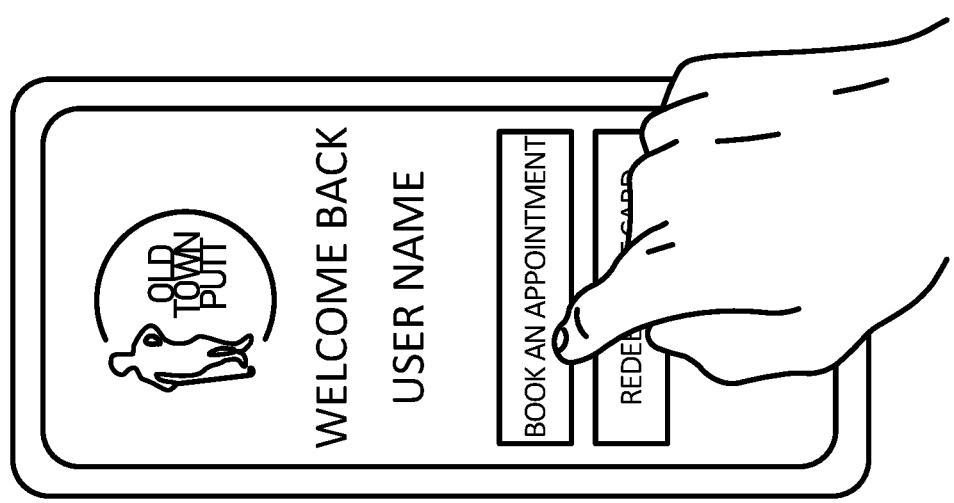
Figure 14B:
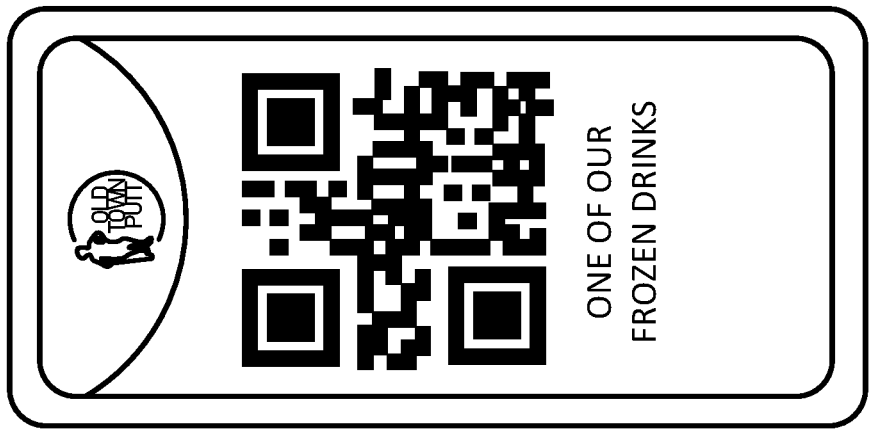
FIGS. 14A and 14B depict screenshots of a gaming application according to an embodiment of the present technology that may be used to facilitate game play and game-related features for the player using the gaming system in the miniature golf facility of FIGS. 1 and 2.
Figure 14A:
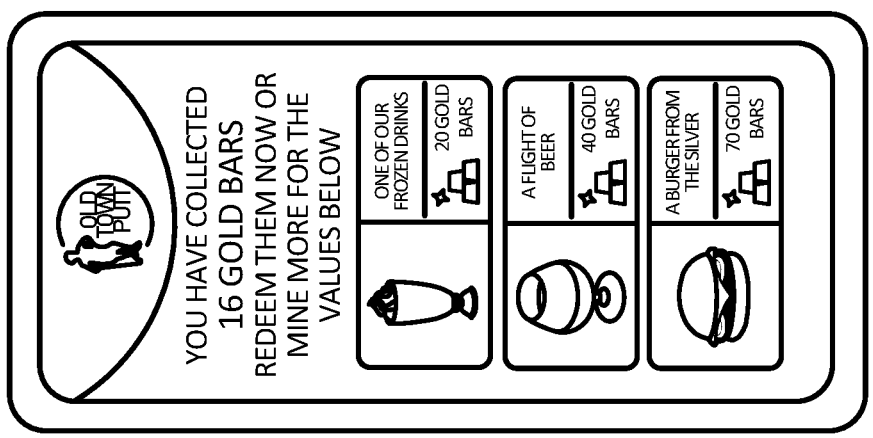

FIGS. 13A to 13C depict screenshots of a gaming application according to an embodiment of the present technology that may be used to facilitate game play and game-related features for the player using the gaming system in the miniature golf facility of FIGS. 1 and 2. FIGS. 14A and 14B depict screenshots of a gaming application according to an embodiment of the present technology that may be used to facilitate game play and game-related features for the player using the gaming system in the miniature golf facility of FIGS. 1 and 2. Illustrated in FIGS. 13A to 13C, 14A and 14B are example graphical user interfaces (GUIs) of a gaming app provided or hosted by a player experience engine of the AR gaming system 101. The causing of the GUIs shown in FIGS. 13A to 13C, 14A and 14B to be displayed on the display device 124 of a player's 106 smartphone 122 may be mediated or other facilitated by I/O controller 608 via communication interface transmitting and receiving signals (e.g., signal(s) 167 shown in FIG. 1) to and from antenna(s) (e.g., transceiver(s)) or communication interface(s) of the smartphone 122. The gaming app may provide enhancements to players' 106 experiences with the AR game on several levels. As shown in FIGS. 13A and 13B, for instance, a player 106 may login to a personalized account of the gaming app and may schedule a tee time for an AR miniature golf game at facility 100 using a calendar type GUI. In FIG. 13C, the player 106 is provided visual confirmation of their tee time for the AR miniature golf game that he or she scheduled. A game business engine AR gaming system 101 may be further associated with the player experience engine. As shown in FIG. 14A, for example, players 106 who reach certain levels of participation or performance in AR miniature golf games may be rewarded (e.g., as a number of "gold bars") redeemable for various food or drink items at facility 101 having, for instance, a tavern in it. Player 106 can select the reward he or she desires to receive by touching the respective item (e.g., a frozen drink), whereupon a QR code to be scanned by the tavern waiter, waitress or bartender is provided, as shown in FIG. 14B.

Figure 15:
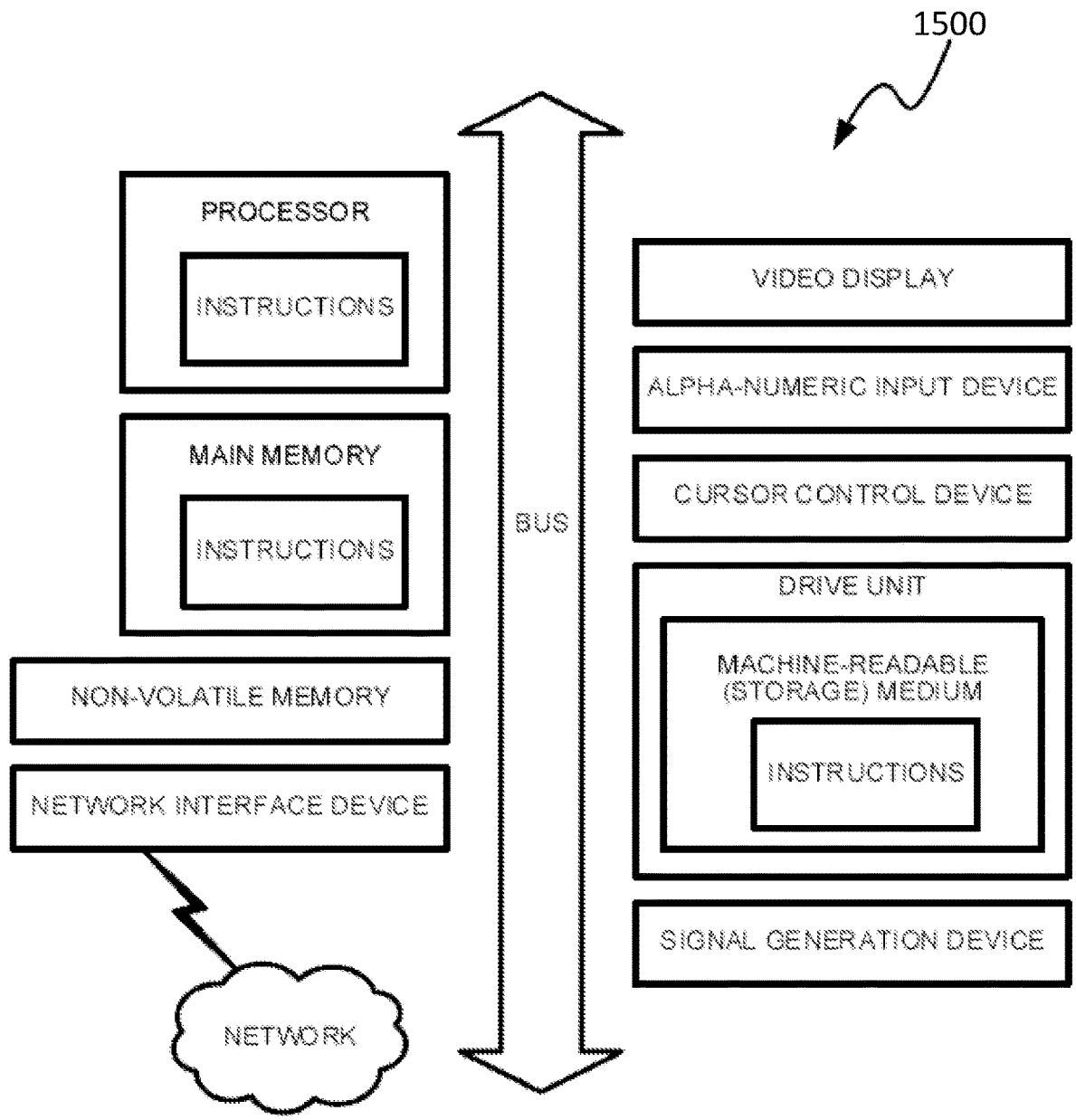
FIG. 15 depicts a diagrammatic representation of a machine, in the example form, of a computer system within which a set of instructions, for causing the machine to implement or otherwise perform any one or more of the techniques and methodologies of the present technology described herein, may be executed.

FIG. 15 depicts a diagrammatic representation of a machine, in the example form, of a computer system 1500 within which a set of instructions, for causing the machine to implement or otherwise perform any one or more of the techniques and methodologies discussed herein, may be executed. Computer system 1500 may, for some embodiments of the present technology, be representative of controller means including, without limitation, controller 608.

In the example of FIG. 15, the computer system includes a processor, memory, non-volatile memory, and an interface device. Various common components (e.g., cache memory) are omitted for illustrative simplicity. The computer system 1500 is intended to illustrate a hardware device on which any of the components depicted in the examples of FIGS. 6 and 7 (and any other components described in this specification) can be implemented. For example, the computer system 1500 can be an onboard processor of the AR glasses 120, or computer system 1500 can be computing device 114. The computer system 1500 can be of any applicable known or convenient type. The components of the computer system can be coupled together via a bus or through some other known or convenient device.

The processor may be, for example, a conventional microprocessor such as an INTEL PENTIUM microprocessor or MOTOROLA POWER PC microprocessor. One of skill in the relevant art will recognize that the terms "machine-readable (storage) medium" or "computer-readable (storage) medium" include any type of device that is accessible by the processor. In some embodiment, these storage media are embodied in non-transitory computer-readable media that can store program instructions (e.g., as software or firmware) which, when executed by one or more processors of the disclosed technology (e.g., gaming system 101), cause the controller means (e.g., controller 608) to implement, execute, or otherwise facilitate performance of the various algorithms and methods disclosed herein.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1500 can be controlled by operating system software that includes a file management system, such as a disk operating system. One example of operating system software with associated file management system software is the family of operating systems known as WINDOWS from MICROSOFT Corporation of Redmond, Wash., and their associated file management systems. Another example of operating system software with its associated file management system software is the LINUX operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an IPHONE, a BLACKBERRY, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

With respect to the above description then, it is to be realized that the optimum dimensional relationships, to include variations in size, materials, shape, form, position, function and manner of operation, assembly, type of sensors/emitters (radio frequency identification (RFID), near field communication (NFC), barcode, etc.), shape, manner, and type of play environment (mini-golf, golf, soccer, basketball, tennis, etc.) and use, are intended to be encompassed by the present disclosure.

It is contemplated herein that the apparatuses, systems and methods of the disclosure include variations in AR components and technologies as well as gameplay features. The AR components and technologies may include but are not limited to off-the-shelf products such as smart phones, AR glasses, watches, goggles, masks, headsets, controllers, computing devices, the like and/or combinations thereof. Customized AR components and technologies may also be included, but are not limited to, static or moving environmental elements with AR integration, sporting goods integrated with AR capabilities, customized eyewear/headwear, the like and/or combinations thereof. While specific sports may be mentioned in the description herein, the disclosure is not so limited and other gameplay or sporting elements may include but are not limited to archery, badminton, cricket, croquet, bowling, boxing, curling, tennis, skateboarding, surfing, hockey, figure skating, yoga, fencing, fitness, traditional golf, minigolf, golf driving ranges, gymnastics, karate, volleyball, weightlifting, basketball, baseball, rugby, wrestling, track and field events, hang gliding, car/boat/plane/bike/motorcycle racing, cycling, running, table tennis, fishing, judo, climbing, billiards/pool, shooting, clay pigeon, diving, snorkeling, horse racing, horseback riding, football (American or soccer), the like and/or combinations thereof. Gameplay environmental elements and/or sporting equipment may include physical objects having a physical size, shape, design, etc., or may be virtual and/or AR elements that may or may not interact physically and/or virtually with physical/real world objects. Interaction with physical and/or virtual objects may cause visual and/or haptic feedback to be experienced by a user of the disclosed apparatuses, systems, and methods. Gameplay may be performed at a dedicated location or may be made available at on-demand locations.

While the description and drawings may describe or illustrate specific themes, designs, movements, interactions, the like and/or combinations thereof, the disclosure is not so limited. One skilled in the art may introduce new origins, movements, interactions, the like and/or combinations thereof to further enhance or diversify gameplay and those improvements and enhancements are intended to be covered by the disclosure herein. Gameplay elements, such as a ball or a club, may further include specialized components that interact with both physical components of the disclosed system and/or virtual elements of the disclosed system, thereby causing obstructions, change in speed, vibrations, sounds, visual effects, novelty effects, machine triggers, the like and/or combinations thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above detailed description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above detailed description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above detailed description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112 (f), other aspects may likewise be embodied as a means-plus-function claim, or in other forms, such as being embodied in a computer-readable medium (any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above detailed description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly defines such terms. Accordingly, the actual scope of the invention encompasses not only the disclosed examples, but also all equivalent ways of practicing or implementing the invention.

The embodiments of the invention in which an exclusive property or privilege is claimed are defined as follows:

1. A method comprising:
   providing an AR computing device having a display;
   providing an augmented reality (AR) game to a player via the AR computing device, the AR game being associated with a physical game space including a plurality of real world physical structures;
   providing a game object, movable within the physical game space by a player;
   striking the game object to cause the game object to move within the physical game space relative to the plurality of real world physical structures independent of the player;
   sampling a first signal encoding data representative of a location of the game object in the physical game space, wherein the first signal is, or originates from, a first sensor's signal that identifies the game object;
   sampling a second signal encoding data representative of the location of the game object in the physical game space, wherein the second signal is, or originates from, a second sensor's signal that identifies the game object, and wherein the second sensor is different from the first sensor;
   tracking the location of the game object as it moves in the physical game space independent of the player, wherein the tracking is based upon the data representative of the location of the game object from both of the first, and the second, signals; and
   causing visual graphics to be provided to the AR computing device, wherein the visual graphics include themed graphics overlaid on and aligned with one or more of the real world physical structures of the game space in response to tracking the location of the game object as it moves within the physical game space relative to the plurality of real world physical structures independent of the player.

2. The method of claim 1, wherein causing the visual graphics to be provided to the AR computing device comprises causing animated themed graphics to be provided to the AR computing device overlaid on and aligned with one or more real world physical structures of the game space in response to a change of the location of the game object in the physical game space.

3. The method of claim 2, wherein the AR computing device plays audio synchronized with the animated themed graphics.

4. The method of claim 1 further comprising determining that the location of the game object in the physical game space is at, or within a predetermined distance of, at least one instance of the visual graphics, and causing different themed graphics to be provided to the AR computing device overlaid on and aligned with one or more real world physical structures of the game space in response to the determining.

5. The method of claim 1 further comprising determining a change in computational speed or accuracy for the tracking, wherein determining the change in computational speed or accuracy for the tracking comprises at least one of:
 determining a change in bandwidth for at least one of: the sampling the first signal, and the sampling the second signal;
 determining a divergence of computed results for the location of the object in the game space as between the data representative of the location of the object from both of the first and the second signals; and
 determining a change in an average velocity at which the object moves in the game space.

6. The method of claim 1, wherein the second sensor includes: at least one first video imaging sensor positioned in at least a first location in the physical game space, and at least one second video imaging sensor positioned in at least a second location in the physical game space, wherein the second signal includes: a second signal, and a third signal, wherein the second signal is, or originates from, a first optical signal that identifies the game object, and wherein the third signal is, or originates from, a second optical signal that identifies the game object.

7. The method of claim 1 further comprising determining the location of the game object in the game space based upon the data representative of the location of the object from the first signal using a trilateration or triangulation algorithm.

8. The method of claim 1, wherein the AR computing device plays audio in response to the location of the object tracked in the game space.

9. The method of claim 1, wherein visual graphics are provided to the AR computing device according to a game script and the method further includes mapping the visual graphics to positions in the game space according to different locations of the game object within the game space relative to the plurality of real world physical structures of the game space.

10. The method of claim 1, including:
 associating locations of the game object in the physical game space with different pre-scripted renderings of visual graphics for the AR gaming system; and
 provisioning graphics for the AR computing device independent of the location of the tracked object.

11. The method of claim 1, wherein the themed graphics include a themed object graphic and wherein, during a game play experience, the AR gaming system renders an animated themed object graphic associated with the themed object graphic.

12. An augmented reality (AR) gaming system for operation within a game space including a plurality of real world physical structures, the AR gaming system comprising:
 a processor;
 a communication interface operably coupled in communication with the processor;
 a first sensor operably coupled in communication with the processor, and configured to transmit, to the processor via the communication interface, a first sensor signal that identifies an object in a game space of the AR system;
 a second sensor operably coupled in communication with the processor, and configured to transmit, to the processor via the communication interface, a second sensor signal that identities the object in the game space;
 an AR apparatus in an AR game provided, at least in part, to the player by the AR gaming system,
 wherein the object is movable by the player in the AR game by being struck to cause the object to move within the game space relative to the plurality of real world physical structures independent of the player, and
 wherein the processor is configured or programmed to:
  sample a first signal encoding data representative of a location of the object in the game space, wherein the first signal is, or originates from, the first sensor signal;
  sample a second signal encoding data representative of the location of the object in the game space, wherein the second signal is, or originates from, the second sensor signal and wherein the second sensor is different from the first sensor;
  track the location of the object in the game space based upon the data representative of the location of the object as it moves independent of the player within the game space from both of the first, and the second, sensor signals;
  cause visual graphics to be provided to the AR apparatus in response to the location of the object being tracked in the game space as it moves independent of the player within the game space; and
  cause themed graphics to be provided to the AR apparatus overlaid on and aligned with one or more of the real world physical structures of the game space in response to the location of the object being tracked in the game space as it moves independent of the player within the game space.

13. The AR gaming system of claim 12, wherein the processor is further configured or programmed to determine a change in computational speed or accuracy at which the location of the object is tracked, wherein to determine the change in computational speed or accuracy at which the location of the object is tracked, the processor is further configured or programmed to at least one of:
 determine a change in bandwidth for at least one of: the first signal, and the second signal, being sampled;
 determine a divergence of computed results for the location of the object in the game space as between the data representative of the location of the object from both of the first, and the second, signals; and
 determine a change in an average velocity at which the object moves in the game space.

14. The AR gaming system of claim 12, wherein the second sensor includes: at least one first video imaging sensor positioned in at least a first location in the game space, and at least one second video sensor positioned in at least a second location in the game space, wherein the second signal includes: a second signal, and a third signal, wherein the second signal is, or originates from, a first optical signal that identifies the object, and wherein the third signal is, or originates from, a second optical signal that identifies the object.

15. The AR gaming system of claim 12, wherein the first sensor includes at least two beacon anchors positioned in the game space, and wherein the first signal is, or originates from, a beacon signal that identifies the object, and wherein to sample the first signal, the processor is further configured or programmed to receive, via the communication interface, the first signal from the at least two beacon anchors.

16. The AR gaming system of claim 15, wherein the processor is further configured or programmed to determine the location of the object in the game space based upon the data representative of the location of the object from the first signal using a trilateration or triangulation algorithm.

17. The AR gaming system of claim 12, wherein the processor is configured or programmed to:
cause the themed graphics to be provided to the AR computing device according to a game script; and
map the themed graphics to positions in the game space according to different locations of the game object within the physical game space.

18. The AR gaming system of claim 12, wherein the processor is configured or programmed to:
associate locations of the game object in the physical game space with different pre-scripted renderings of themed graphics; and
provision graphics for the AR computing device independent on the location of the tracked object.

19. The AR gaming system of claim 12, wherein the processor is configured or programmed to cause animated themed graphics to be displayed on the AR apparatus overlaid on and aligned with one or more of the real world physical structures of the game space.

20. The AR gaming system of claim 12, wherein the processor is configured or programmed to determine that the location of the object in the game space is at, or within a predetermined distance of, at least one instance of the themed graphics, and in response cause different themed graphics to be displayed on the AR apparatus overlaid on and aligned with one or more of the real world physical partitioning structures of the game space.

21. The AR gaming system of claim 12, further including a speaker wherein the processor is configured or programmed to play audio on the speaker that is synchronized with the themed graphics in response to the location of the object tracked in the game space.

22. One or more non-transitory computer readable media having program instructions stored thereon which, when executed by at least one processor of an augmented reality (AR) gaming system, cause a machine to:
sample a first signal encoding data representative of a location of an object in a game space of the AR gaming system, wherein the first signal is, or originates from, a first sensor's signal that identifies the object, and wherein the object is movable by a player in an AR game provided, at least in part, to the player by the AR gaming system;
sample a second signal encoding data representative of the location of the object in the game space, wherein the second signal is, or originates from, a second sensor's signal that identifies the object, and wherein the second sensor is different from the first sensor;
track the location of the object in the game space after being struck to cause the object to move within the game space relative to one or more real world physical structures of the game space independent of the player based upon the data representative of the location of the object from both of the first, and the second, signals;
cause visual graphics to be provided to an AR apparatus in response to the location of the object being tracked in the game space; and
cause themed graphics to be provided to the AR apparatus for overlay on and alignment with one or more real world physical structures of the game space in response to the location of the object within the game space relative to one or more real world physical structures of the game space.

23. The one or more non-transitory computer readable media of claim 22 having program instructions stored thereon which, when executed by at least one processor of an augmented reality (AR) gaming system, cause a machine to:
associate locations of the object in the game space with different pre-scripted renderings of visual graphics for the AR gaming system; and
provision graphics for the AR gaming system independent on the location of the tracked object.

24. The one or more non-transitory computer readable media of claim 22 having program instructions stored thereon which, when executed by at least one processor of an augmented reality (AR) gaming system, cause a machine to: play audio in response to the location of the object tracked in the game space.

* * * * *